(12) United States Patent
Brukilacchio

(10) Patent No.: US 8,152,347 B2
(45) Date of Patent: Apr. 10, 2012

(54) LIGHT EMITTING DIODE LINEAR LIGHT FOR MACHINE VISION

(75) Inventor: Thomas J. Brukilacchio, Reading, MA (US)

(73) Assignee: Innovations in Optics, Inc., Woburn, MA (US)

( * ) Notice: Subject to any disclaimer, the term of this patent is extended or adjusted under 35 U.S.C. 154(b) by 293 days.

(21) Appl. No.: 12/652,194

(22) Filed: Jan. 5, 2010

(65) Prior Publication Data

US 2010/0188017 A1 Jul. 29, 2010

Related U.S. Application Data

(60) Provisional application No. 61/147,436, filed on Jan. 26, 2009.

(51) Int. Cl.
*F21V 5/02* (2006.01)
(52) U.S. Cl. .................... 362/555; 362/552; 362/558
(58) Field of Classification Search .................. 362/555, 362/552, 558, 580, 218, 249.02
See application file for complete search history.

(56) References Cited

U.S. PATENT DOCUMENTS

| | | | |
|---|---|---|---|
| 4,915,479 A | 4/1990 | Clarke | |
| 6,205,998 B1 | 3/2001 | Winston | |
| 6,272,269 B1 | 8/2001 | Naum | |
| 6,318,863 B1 | 11/2001 | Tiao et al. | |
| 6,967,986 B2 | 11/2005 | Kowarz et al. | |
| 6,968,103 B1 | 11/2005 | Schroll et al. | |
| 7,001,084 B2 | 2/2006 | Carpenter et al. | |
| 7,234,820 B2 | 6/2007 | Harbers et al. | |
| 7,455,410 B2 | 11/2008 | Furusawa et al. | |
| 7,481,538 B2 | 1/2009 | Furusawa et al. | |
| 2002/0114168 A1 | 8/2002 | Pelka et al. | |
| 2005/0169579 A1 | 8/2005 | Temkin et al. | |
| 2005/0224846 A1 | 10/2005 | Imato et al. | |
| 2005/0275819 A1 | 12/2005 | Tolbert et al. | |
| 2006/0041192 A1 | 2/2006 | Klootz | |
| 2006/0043400 A1 | 3/2006 | Erchak et al. | |
| 2006/0199144 A1 | 9/2006 | Liu | |
| 2007/0206390 A1 | 9/2007 | Brukilacchio et al. | |
| 2008/0246920 A1 | 10/2008 | Buczek | |
| 2010/0098399 A1* | 4/2010 | Breish et al. | 362/355 |

OTHER PUBLICATIONS

International Search Report and Written Opinion of PCT/2010/000015 mailed on Jul. 29, 2010.
Welford, W.T. and Winston, R.,"High Collection Nonimaging Optics", Academic Press, pp. 55-64.

* cited by examiner

*Primary Examiner* — David V Bruce
(74) *Attorney, Agent, or Firm* — Francis J. Caufield

(57) ABSTRACT

The invention herein comprises a linear lighting system which incorporates light emitting diode (LED) light sources with one or more distinct colors including broad band white light. The LED die or die arrays are mounted to a high thermal conductivity circuit board comprising COB technology which can include both the LED die and electronic drive components resulting in a more compact and reliable design with improved thermal and optical performance at lower cost. In conjunction with high efficiency imaging collection optics and aberration corrected cylindrical optics, the output of the LED sources are imaged to a bright line suitable for use in machine vision applications and the like.

18 Claims, 24 Drawing Sheets

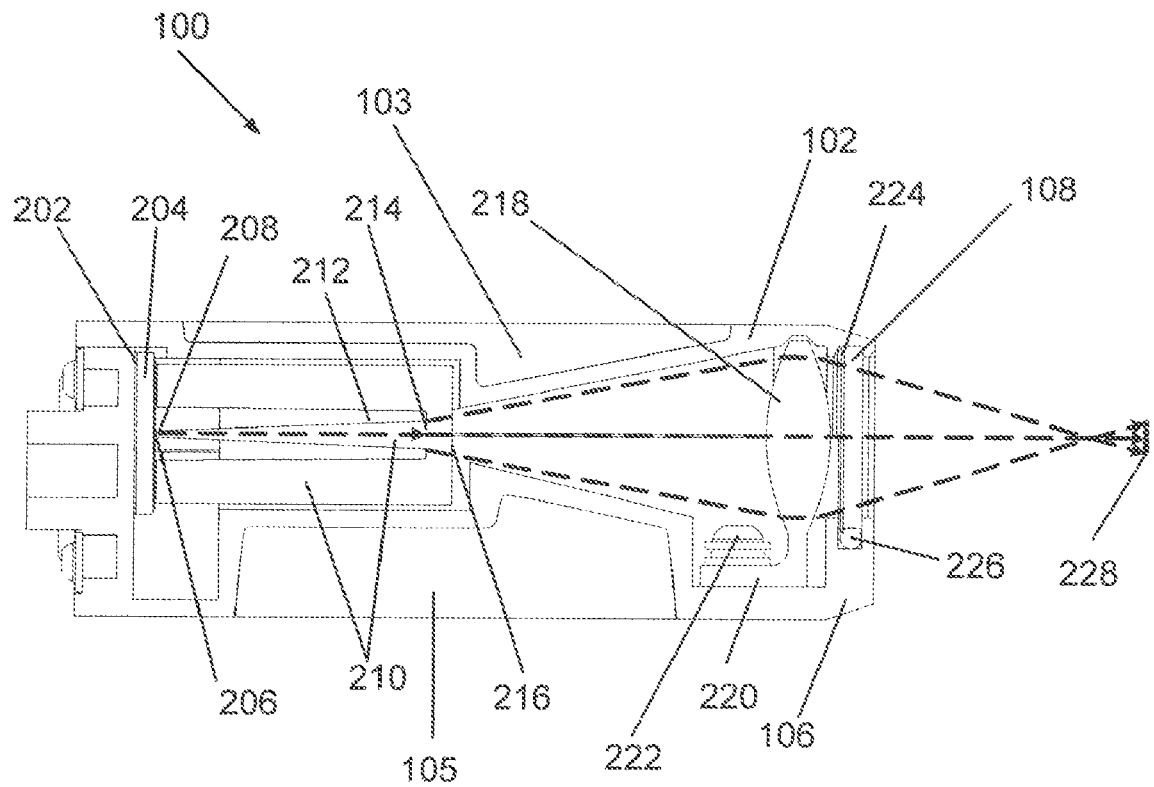
FIG. 2
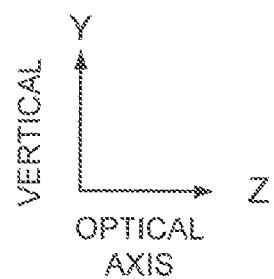

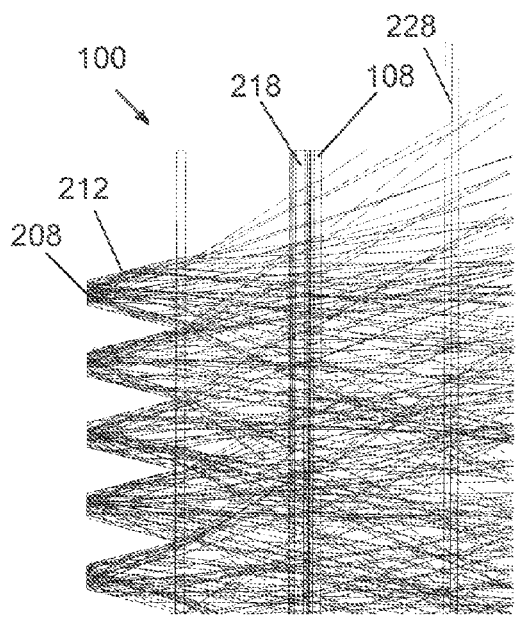
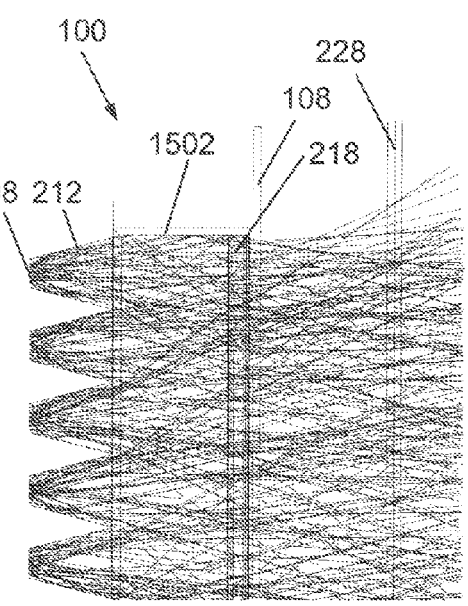
FIG. 15(a)    FIG. 15(b)
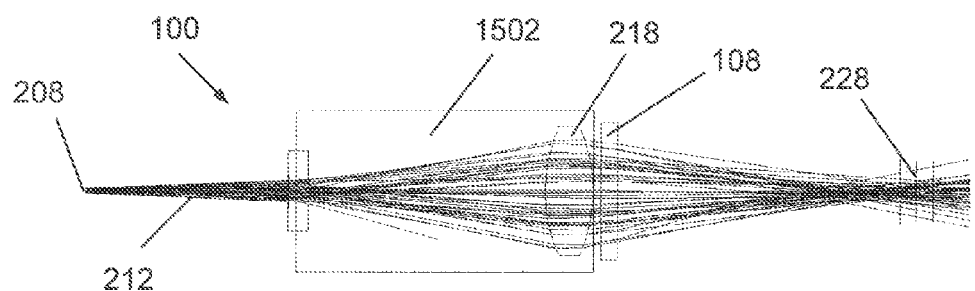
FIG. 15(c)

LIGHT EMITTING DIODE LINEAR LIGHT FOR MACHINE VISION

CROSS REFERENCE TO RELATED APPLICATION

This application claims priority from U.S. Provisional Patent Application No. 61/147,436 entitled LIGHT EMITTING DIODE LINEAR LIGHT FOR MACHINE VISION and filed on Jan. 26, 2009 in the name of Thomas J. Brukilacchio, the entire contents of which are incorporated herein by reference.

FIELD OF THE INVENTION

This invention, in general, relates to providing a continuous high intensity line of light suitable for illuminating the field of view of linear imaging systems typically used in machine vision applications and, more particularly, to the use of light emitting diodes (LEDs) in high intensity linear lighting systems. Other applications that could make use of such a lighting system include edge illuminated backlighting for large screen televisions, commercial signage, and linear tube fluorescent LED replacement lamps.

BACKGROUND OF THE INVENTION

High brightness light emitting diode (LED) light sources are in high demand for challenging applications in machine vision. Prior art in the machine vision lighting field typically utilize tungsten or tungsten halogen, metal halide, and xenon arc lamps or, more recently, systems incorporating pre-packaged high brightness LEDs. High intensity linear lighting is used to illuminate the field of view of line scan cameras to visualize objects including printed materials on high speed printers and a variety of manufactured products that travel by on a moving conveyor belt or platform for what is typically referred to as web inspection. High performance, low cost, compact, and reliable linear lighting is desirable for such tasks.

Until recently, tungsten halogen lamps typically coupled into glass fiber optic bundles arranged in a line and imaged to a line by use of a spherical cylindrical lens was the industry standard. Companies such as Schott Fiber Optics, Dolan Jenner, Volpi, Illumination Technology, and Fiberoptic Technology manufacture such products with a range of available intensities and line lengths. For example, a single twenty four inch long linear lighting system from Schott Fiber Optics, the recognized industry leader, is comprised of two separate tungsten halogen light boxes coupled to two one half inch glass fiber optic cables which, in turn, terminate into a single twenty four inch long length of fiber which images to the illumination plane by use of a cylindrical spherical rod lens. With a new tungsten halogen 150 Watt EKE Lamp, this system yields a maximum of approximately one million Lux (lumens per square meter). One of the most serious limitations of tungsten halogen technology is that the intensity of the lamps degrades at a fast rate. At full power, tungsten halogen lamps last only between about 50 hours and 500 hours before their initial intensity has degraded by the order of 50%, or the lamps fail by filament burn out. The cost of the lamps is not the primary concern, however. It is the cost of shutting down a line to replace the lamp that is primarily driving the need for LED based systems.

Consequently, it is a primary object of the present invention to provide a highly reliable line source of illumination suitable for use in a variety of applications.

It is another object of the present invention to provide a linear line source utilizing LEDs.

It is yet another object of the present invention to provide a high intensity linear line source for use in machine vision applications.

Other objects of the invention will be obvious and others will appear hereinafter when the following detailed description is read in connection with the accompanying drawings.

SUMMARY OF THE INVENTION

The invention herein describes a linear lighting system which incorporates light emitting diode (LED) light sources with one or more distinct colors including broad band white light, ultraviolet, and near infrared. The LED die or die arrays are mounted to a high thermal conductivity circuit board comprising COB technology which can include both the LED die and electronic drive components resulting in a more compact and reliable design with improved thermal and optical performance at lower cost relative to pre-packaged based LED systems and other non LED systems such as the industry standard tungsten halogen lamp coupled to optical fibers arranged in a line. In conjunction with high efficiency imaging collection optics and aberration corrected cylindrical optics, the resulting LED based line source of the present invention is unmatched in performance by any other commercially available line source lighting system. The approach of modular LED modules and lens units internal to the line source housing minimizes overall system cost to the user and can be provided in any desired length. This is a lower cost approach relative to providing complete stand alone modular sections that can be combined into longer sections due to the reduced cost of the bill of materials and electronic drive complexity.

The light from the typically ultraviolet, blue, green, amber, red, infrared or phosphor coated blue (for white light) LED die or die arrays is collected by a linear array of non-imaging concentrators and subsequently imaged to a high intensity line or bar focused within a range from meters to infinity by a bi-aspheric cylindrical lens to the illumination plane characterized by high intensity and uniformity afforded by the optimized form factors of the optical elements.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein:

FIG. 2 is a diagrammatic elevational cross sectional view of the system of FIG. 1;

FIGS. 15a) and 15(b) show diagrammatic top views and FIG. 15(c) shows a diagrammatic side on view of the affect on edge rays for adding a mirror to one end of the linear arrays of LED modules of the invention;

DETAILED DESCRIPTION

Figure 1:
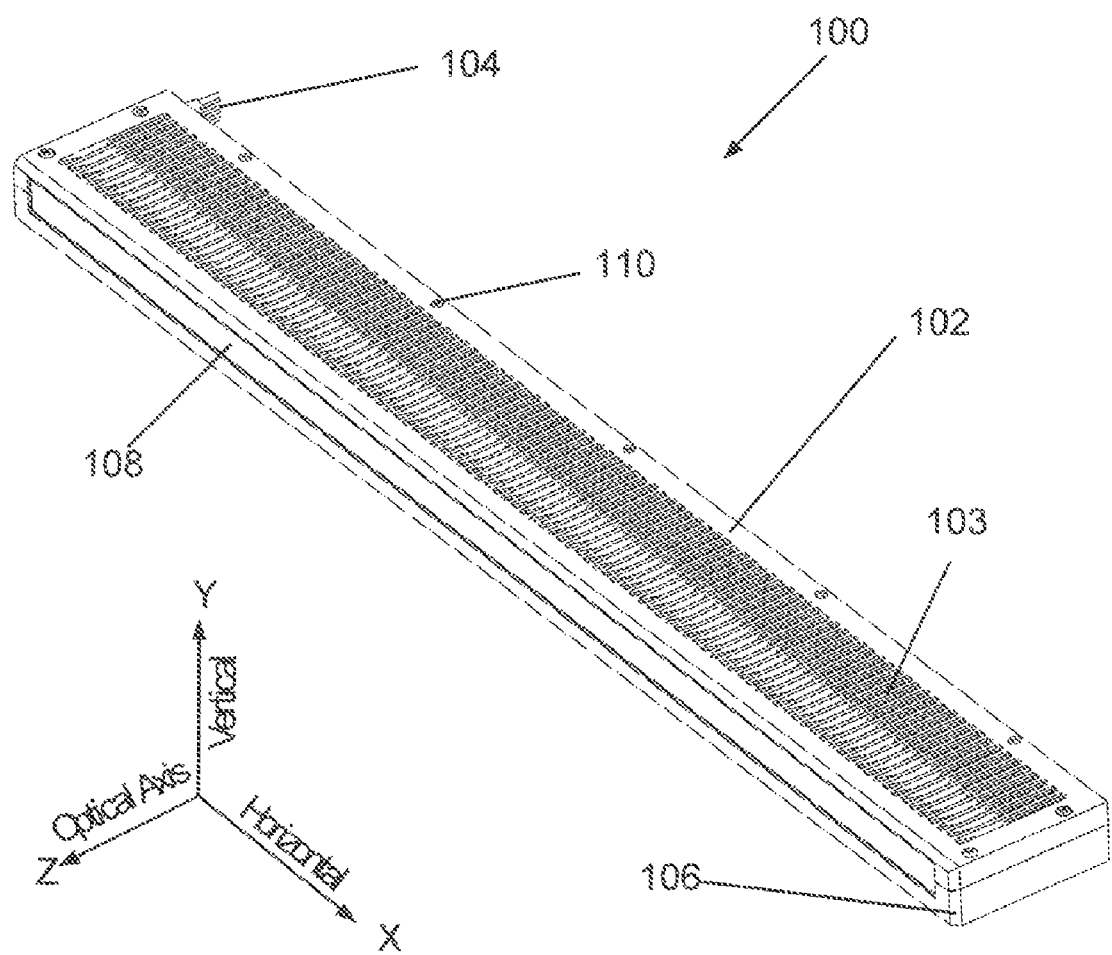
FIG. 1 is a diagrammatic isometric view of a preferred embodiment of a six hundred millimeter long LED line scan illumination system in accordance with the invention.

The present invention relates to Light Emitting Diode (LED) lighting arranged to produce a line of uniform high intensity light suitable for illuminating the field of view of line scan cameras for use in machine vision applications or the like. In particular, the present invention represents an LED based light source for improved line scan and web inspection systems in a more compact form factor, low cost, higher intensity, and increased lifetime relative to previous sources. The present invention also has application to edge lighting of planar light guides for backlighting large area Liquid Crystal Television Displays (LCDs) and similarly for backlighting for commercial signage. Yet another application is for structured under counter lighting and tube type fluorescent lamps.

We define prepackaged LEDs as devices comprising an LED die or die array sitting on top of one or more thermally and electrically conductive materials each with associated thermal impedance with electrical leads and thermal backplane that are then intended to be attached to yet another board with additional thermal impedance. Examples of prepackaged devices include the Luxeon™ and Rebel™ product lines now sold by Philips, the Osram Dragon™ and Ostar™ product lines, and the CREE X-Lamp™ product line. Companies including Code 3/PSE of St. Louis, Mo. and Whelen Engineering Company of Chester, Conn., have successfully launched products incorporating prepackaged LED devices in the emergency lighting market sector.

The present invention uses "Chip-on-Board" (COB) metal core printed circuit board (PCB) technology in conjunction with high efficiency compact imaging and non-imaging optics to provide more compact, higher performance, longer life, and lower cost relative to commercially available systems incorporating pre-packaged LED devices. The thermal impedance between the LED junction and the heat sink is significantly reduced for COB technology by placing the LED die directly on a metal core or on a thin low thermal impedance dielectric and copper foil layer (or other high thermal conductivity material substrate), thereby increasing temperature dependant life and thermally dependant output power. Additionally, because there is no encapsulant or domed optic over the LED die, it is possible to get a much more compact and efficient substantially Etendue (area, solid angle, index squared product) preserving collection optic over the die. Cost is significantly reduced for COB configurations because there is not the additional expense of the components attached to the LED die for the case of pre-packaged LED devices, and much higher packing densities of LED die are possible, which significantly lowers current density and thereby increases efficiency and lowers total required heat dissipation.

The combination of COB technology and high efficiency non-imaging and aberration corrected imaging optics results in a preferred embodiment of the invention which can exceed the maximum intensity of industry typical tungsten halogen linear light sources by about an order of magnitude. Specifically, the prototype of the preferred embodiment runs at an LED current density that is less than one third of the manufacturer's rated current of 350 mA per LED die. Accelerated life testing has been conducted on these LED die at a current of 3000 mA per die with only room temperature convective cooling with no loss in light from the initial brightness after a period of more than 7000 hours of continuous operation. Thus, it is readily apparent that, given sufficient cooling, these LED based line sources have the potential of running continuously at 10 times the intensity of tungsten halogen based line sources with many thousands of hours of continuous and reliable operation.

Referring now to FIG. 1, there is shown a diagrammatic, isometric view of the outside of a preferred embodiment of the LED line source designated generally as system 100. The LED line source system 100 comprises a housing comprised of a top half 102, carrying heat sink fins 103, and a lower half 106, which holds a single piece output window 108 in position in a clam shell arrangement. The housing halves are held together by use of machine screws 110.

Figure 12:
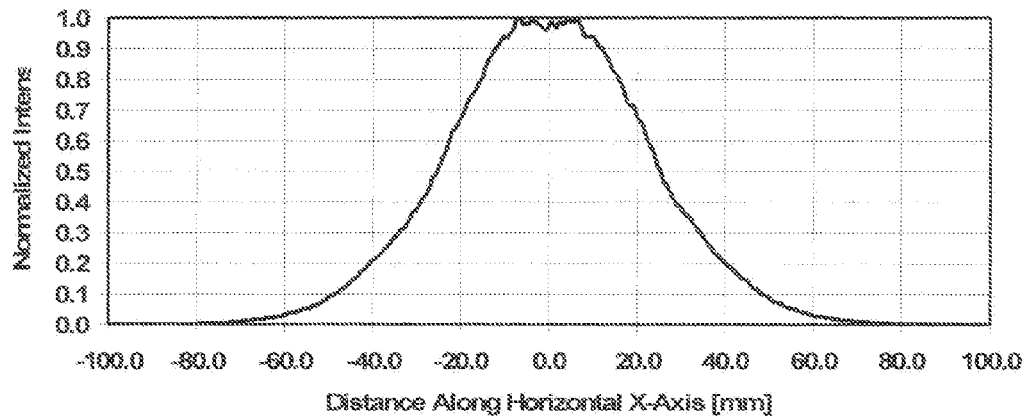
FIGS. 12 A and B show, respectively, graphs of the horizontal and vertical intensity distributions of the optical system of, for example, FIG. 10.
Figure 12:
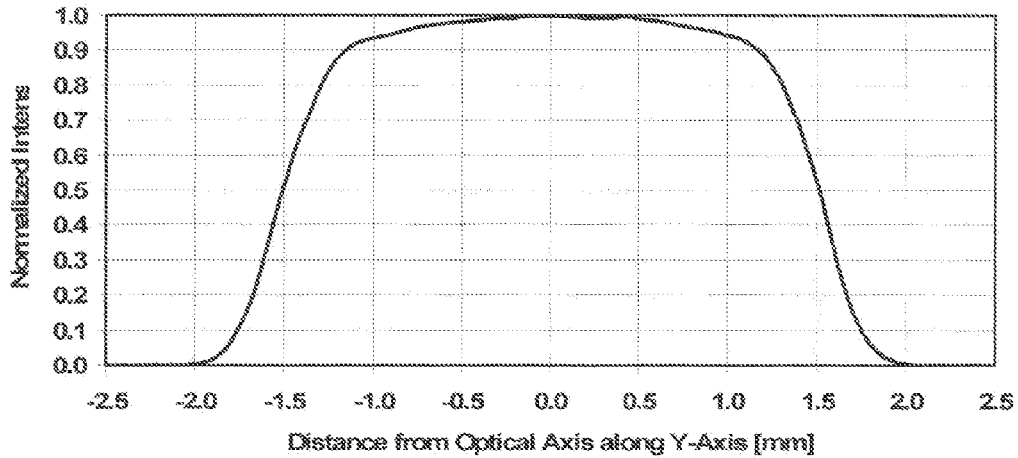

The line source system 100, in a manner to be described, yields a high intensity line along the horizontal X-Axis with a width on the order of four (4 mm) millimeters in the vertical Y-Axis. Light is projected along the optical axis in the Z direction. From the plot of FIG. 12 B, the flat region is on the order of 2.5 mm wide. Generally the useful region would be in the flat region.

The nominal focus is approximately thirty seven (37 mm) millimeters from the window 108 along the optical axis, Z. Power enters the LED module by means of electrical feed through 104.

Referring now to FIG. 2, there is shown a diagrammatic, elevational cross sectional view of system 100 of FIG. 2. A thermally conductive pad 202 of the type manufactured by The Bergquist Company, called Sil-900, couples the heat produced in a metal core LED printed circuit board (PCB) 204 to the housing 106, which, in turn, conducts heat to heat sink fins 105 of the housing bottom half 106 and heat sink fins 103 of cover 102. The LED die are arranged in groups 206 on PCB 204 and couple into an input aperture 208 of a tapered collection optic 212 of a molded collection optic array 210. The light exits each respective taper 212 from each group of LED die at 214 and passes through an attached window at 216. The dashed lines indicate the path of the light from the LED die through the collection optic 210, which is then imaged in the Y-Z plane only by a cylindrical lens 218 to an illumination plane 228.

After passing through the cylindrical lens 218, the light passes through an optional diffuser 224 and output window 108, which is typically made of a robust glass material such as pyrex or borosilicate glass. A compliant material 226 comprised of elastomeric cord stock, such as silicone or other rubber materials, act to keep the window tightly sealed against the cover 102. The lens 218 has an L-shaped extension 220 for mounting on the bottom of housing 106. It will recognized that the L-shaped extension can be configured to that cylindrical lens 218 mounted be mounted with respect to the radiation emerging from the exit pupil of the collection optic 212 to that light emerging from the lens, while converged, can be imaged forward of the apparatus with a range encompassing meters to infinity. In other words, when lens 218 is positioned closer to the light entering it, it can image the light to a finite distance or collimate it to infinity depending on the effective focal length and the position of cylindrical lens 218 with respect to the light entering it.

Figure 3:
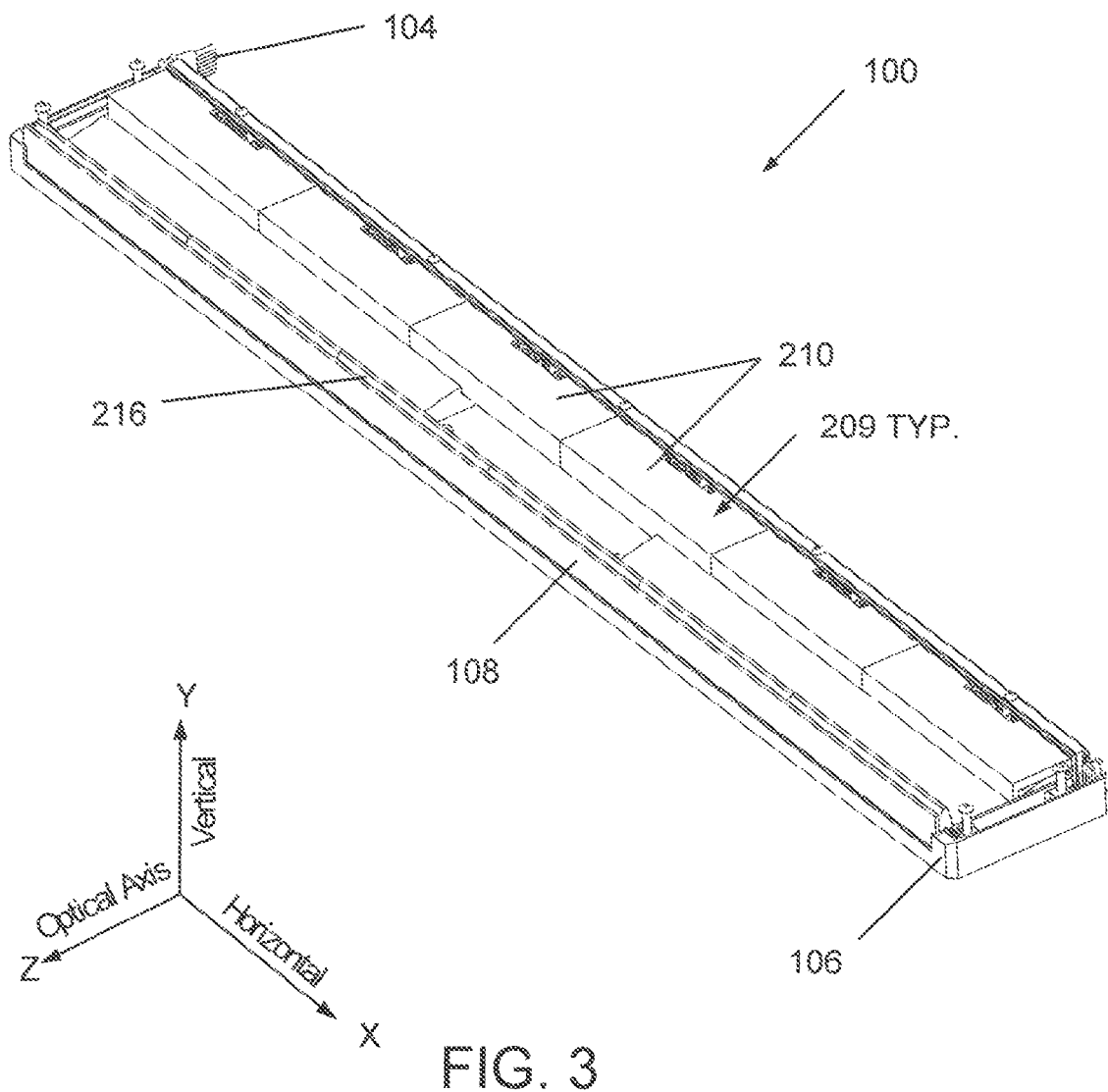
FIG. 3 is a diagrammatic isometric view of the system of FIG. 1 with the housing cover removed showing six, one hundred millimeter long LED modules and associated cylindrical lenses.

Referring now to FIG. 3, there is shown the system 100 of FIG. 1 with the cover 102 removed to reveal six LED modules 209 (typical) each with individual collection optic taper arrays 210 each of one hundred millimeters in length comprising a total array length of six hundred millimeters. Although this embodiment is comprised of six LED modules, any number of modules can be configured to comprise the inventive line source. This modular approach is also extended to cylindrical lenses 218 which are the same length as, and aligned directly in front of each of a corresponding LED module with corresponding collection optics 210. The length of each individual module 209 and optic 210 is not arbitrary, however, in that one must take into account the differential thermal expansion between the material of the housing, which needs to be a good thermal conductor such as aluminum or other similar materials, and that of the optics, which should be made out of a highly transparent molded material such as acrylic, polycarbonate, or cyclic olefin. If the length is too great, the alignment between the LED die or die arrays and the input aperture 208 of a collection optic 212 would move relative to each other as the system 100 changed temperature, thereby compromising throughput. The length of one hundred millimeters for this preferred embodiment represents a good tradeoff of these factors. An additional consideration for the length of each LED PCB 204 and associated collection optic 210 is the incremental length of the unit modular approach. That is, the length of the entire line source, which in this case is represented by six one hundred millimeter long units, is one hundred millimeters such that the total length of the line source for this system would be N times the one hundred millimeter length, where N represents the total number of individual modules of one hundred millimeters in length. The cutout toward the middle of the bottom of the housing 106 can be used for control electronics if desired.

Figure 4:
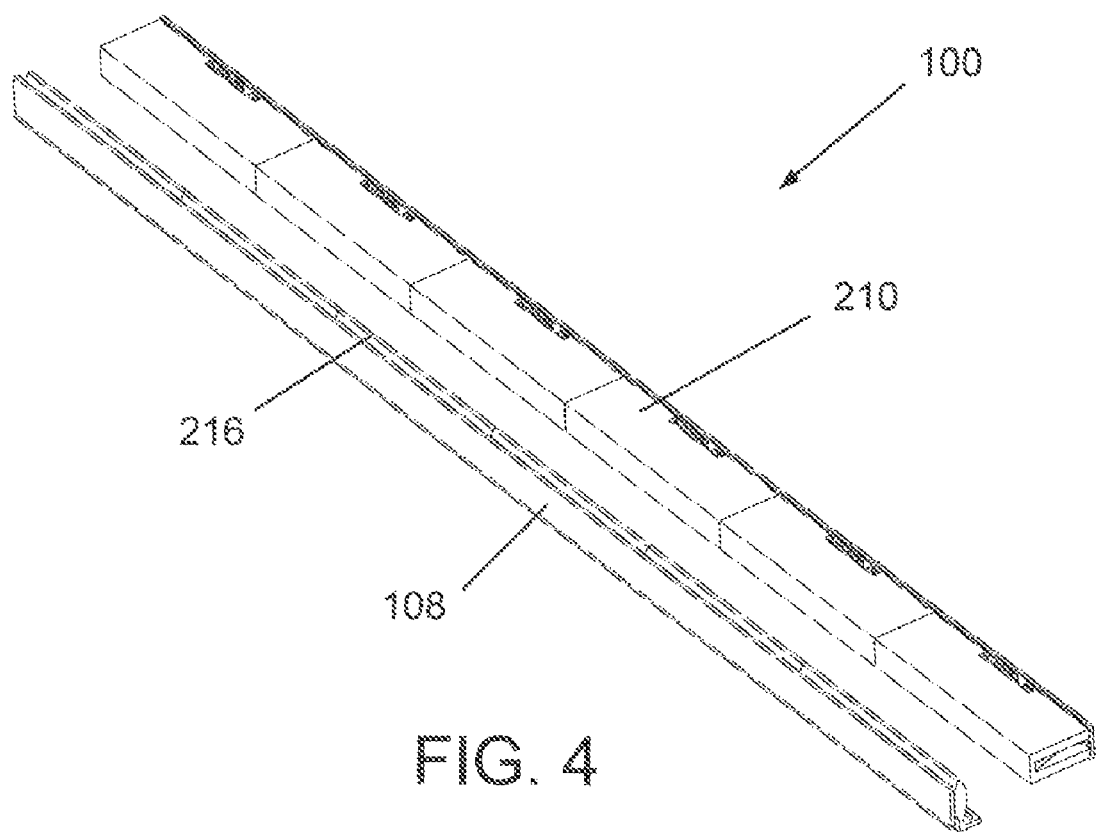
FIG. 4 is a diagrammatic view the system of FIG. 3 with both the top and bottom of the housing cover removed.
Figure 5:
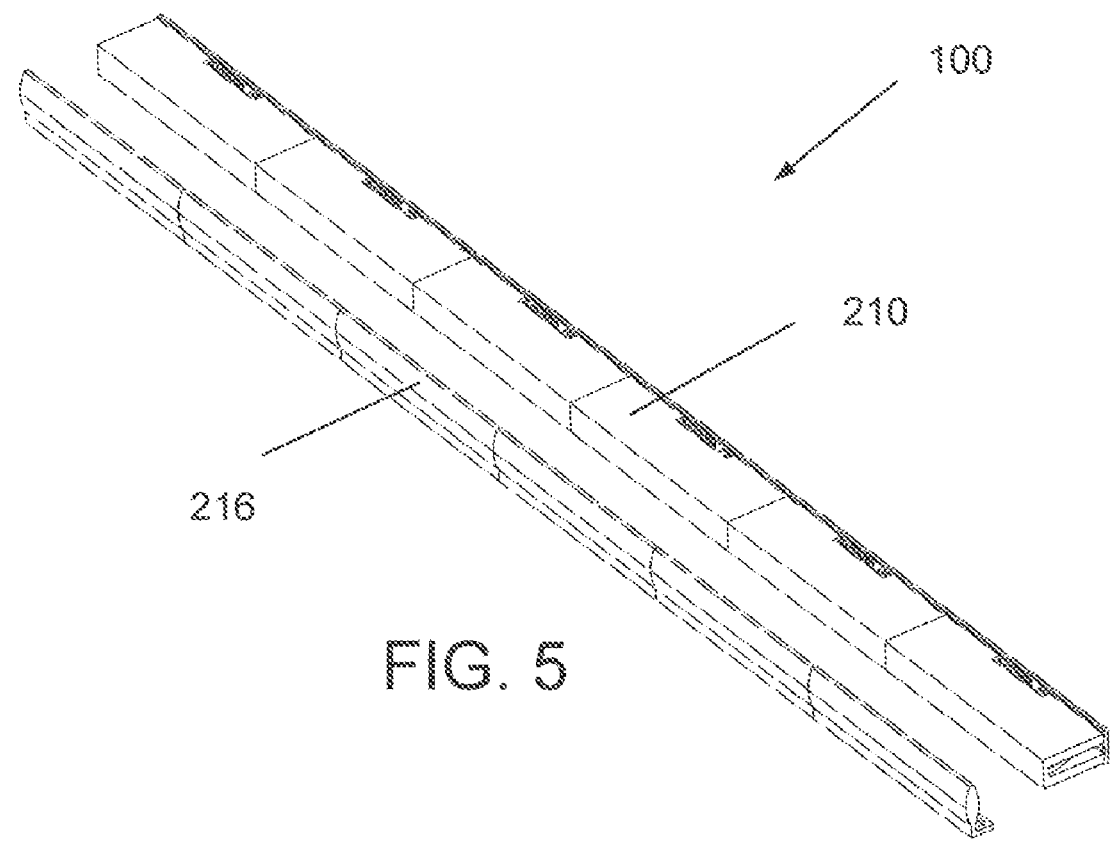
FIG. 5 is a diagrammatic view of the system of FIG. 4 with the one piece diffuser and one piece window removed.
Figure 6:
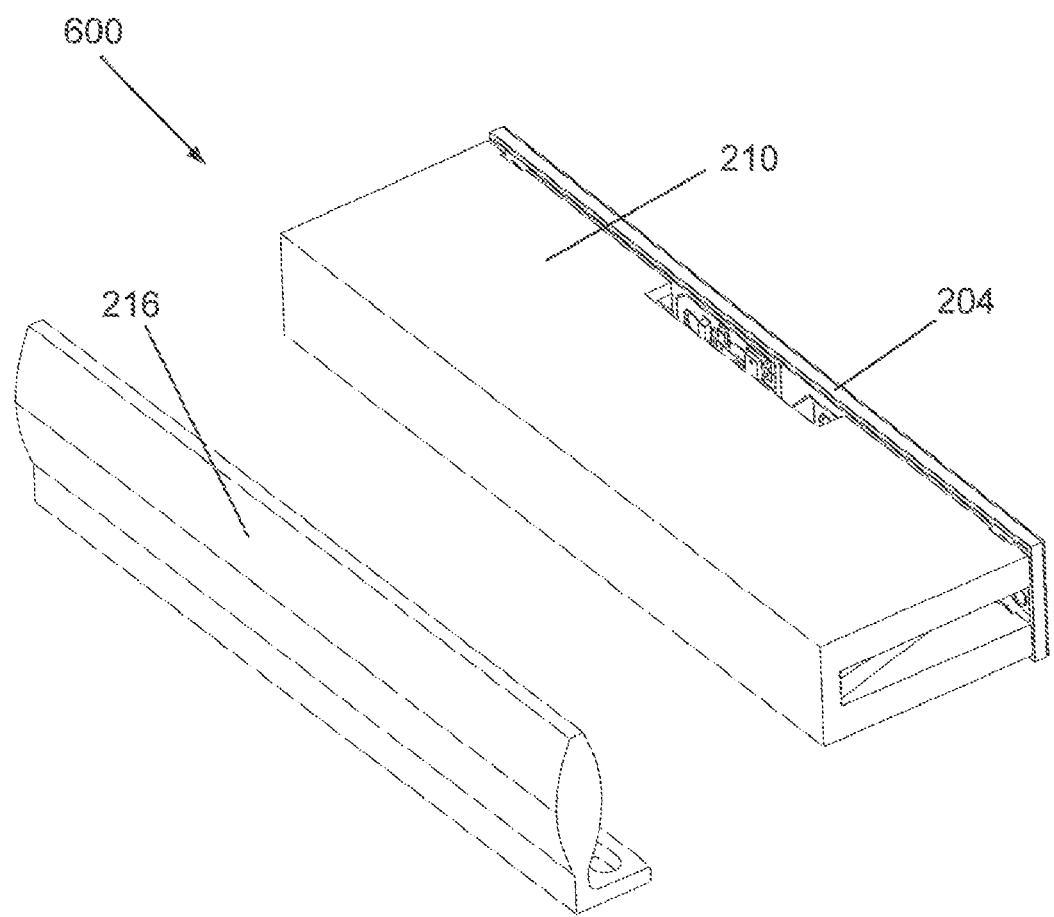
FIG. 6 is a diagrammatic exploded isometric view of a single module and associated cylindrical lens of the system of FIG. 5.

Referring now to FIG. 4, there is shown the system 100 of FIG. 3 with the bottom section 106 of the housing removed revealing the LED PCBs with collection optic arrays 210 and optics 216 and window 108. The window 108 and diffuser 224 (see FIG. 2) have been removed from the system 100 of FIG. 4 as shown in FIG. 5. FIG. 6 shows in diagrammatic perspective a single LED module 600 comprising an LED PCB 204, a molded optic collection array 210, and a cylindrical lens 216.

The details of the collection optic 210 of FIG. 2 are shown in FIGS. 7(a) through (d) for four different views. FIG. 7(d) represents a side on view showing input aperture 208, tapered collection optic 212, exit aperture 216, and aperture 214 introduced in FIG. 2. In a preferred embodiment, tapered collection optic 210 is made out of a highly transparent optical grade thermal plastic such as acrylic, polycarbonate, cyclic olefins (such as is available from Zeon Chemicals), or other transparent materials such as glass or silicone. Similarly, cylindrical lens 218 is made out of one of these materials as well. For increased transmission, the optical surfaces can readily be anti-reflection (AR) coated out of single or multilayer dielectric thin film stacks as are well know in the art. The increase in throughput with AR coatings would be on the order of 20% total, which may be significant for some applications.

Figure 7:
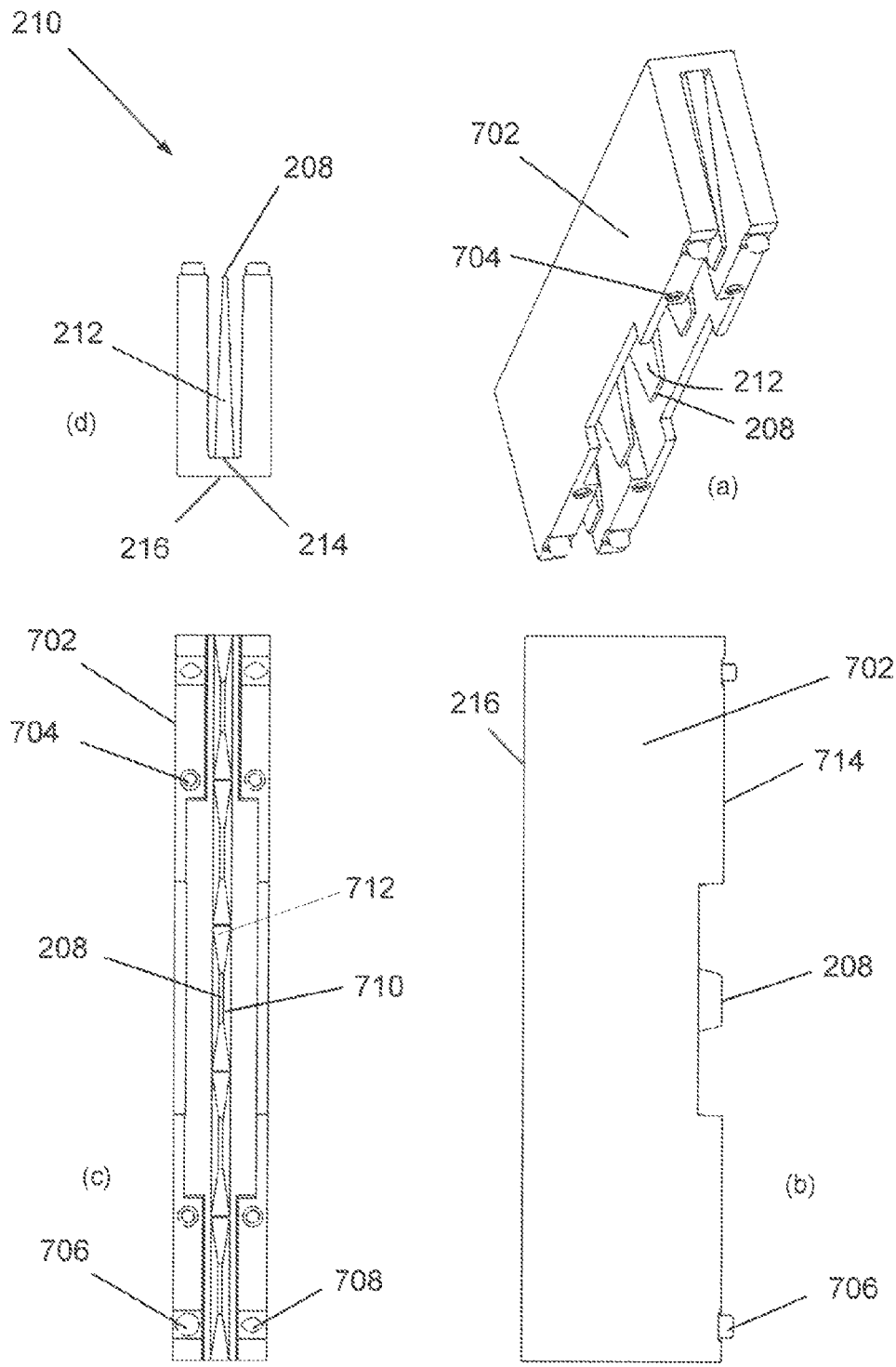
FIG. 7(a) through (d) show four different diagrammatic views of the collection optic of the LED module of FIG. 6 comprised of five tapers attached to a single molded optic.

The view of FIG. 7 (c) is from a perspective looking directly down the optical Z-axis showing a surface 702 which makes contact with the LED PCB 204 of FIG. 2. Also shown in the lower left view FIG. 7 (c) are the kinematic alignment pin 706, which is round, and 708, for which there are three oval pins. The primary kinematic functionality is derived from round alignment pin 706, and the oval alignment pin 708, approximately ninety millimeters away diagonally on the upper right bottom side of the lower left view. The additional oval alignment pins 708 in the lower right of the lower left image and the diagonal oval alignment pin 708 in the upper left of the lower left image are present to insure that any deflection of the optic in the molding process from the ideal dimensions is forced back into position by alignment of the pins with corresponding mating holes in PCB 204.

Optic 210 is comprised of five individual tapers with input aperture 208, narrow sides 712, and wide sides 710, all attached to the balance of the optic 210 at surface 214. The number of individual collection optics can be increased or decreased depending on the specific needs, material types, and thermal environment of a particular application.

As part of the molding process, it is important to maintain a tight tolerance between the PCB interface surface 714 and the five input apertures 208 such that the input apertures do not make direct contact with the LED die or LED die and phosphor. And, that the distance is not so great as to loose light due to too large a distance. A nominal distance of approximately one hundred and thirty microns is a good distance for a readily manufactured product.

A diagrammatic isometric view of the collection optic 210 is shown in the upper right view in FIG. 7(*a*). The dimensions of a single taper 212 are nominally seven millimeters by seven hundred microns rectangular at the input aperture 208, nineteen point eight by two point six rectangular at the output aperture 214 (FIG. 7(*a*)) and twenty five millimeters in length with a center to center spacing of twenty point zero millimeters. The thickness of the window joining the five tapers is nominally two point five millimeters. The advantage of having a thicker window is that the output face of the taper, which is imaged to the illumination plane 228 (FIG. 2) is inside optical plastic, so any dust or surface imperfections on the window of the collection optic are not in sharp focus and have negligible affect on intensity. It will be recognized that other input and output dimensions could be used. For example if the far field angle in the X-Z plane were required to be smaller, then the seven mm dimension of the input aperture could be reduced down to as small as the width of a single LED die.

Figure 8:
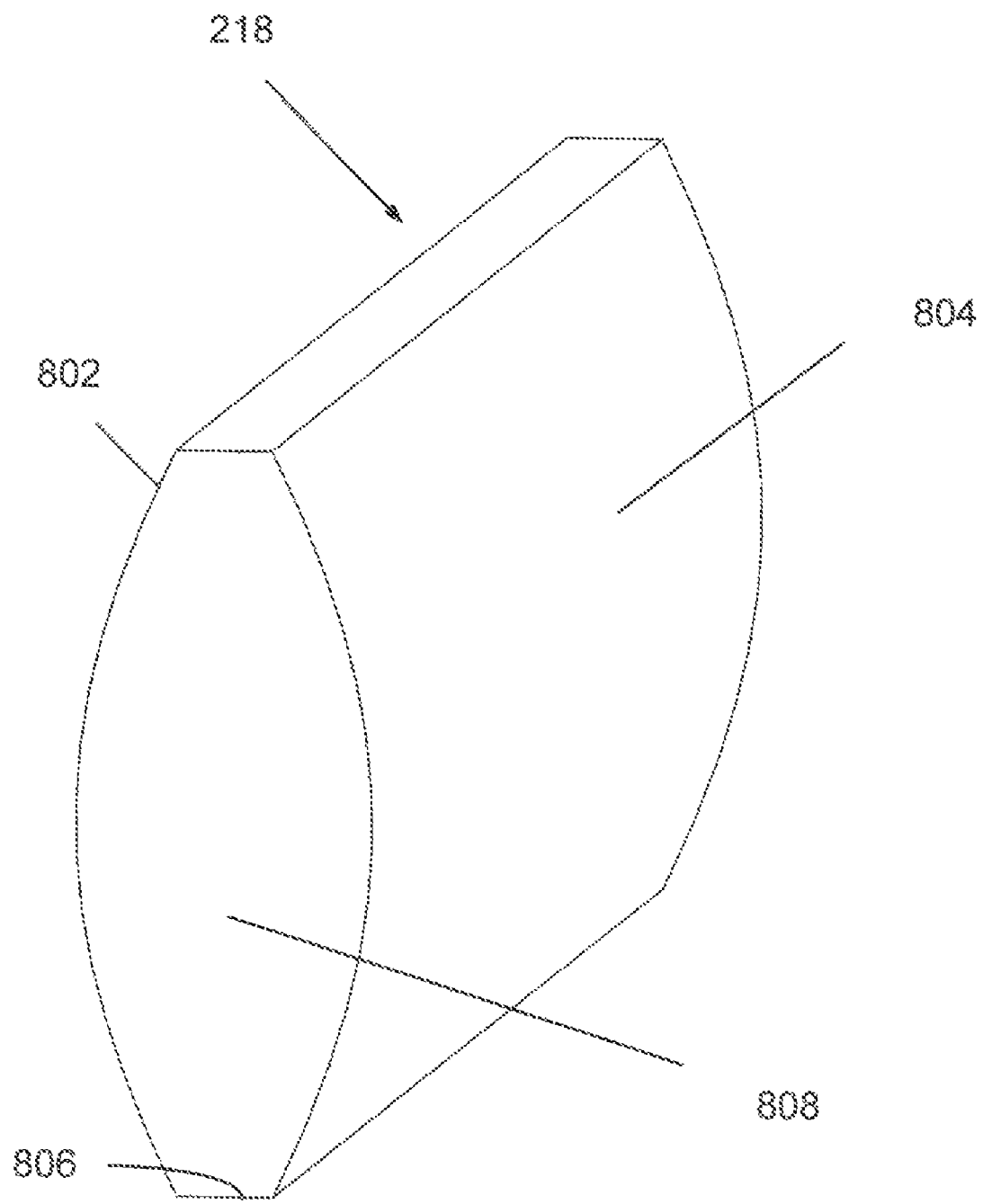
FIG. 8 is a diagrammatic isometric view of one bi-aspheric cylindrical lens of the system of FIG. 6.

Referring now to FIG. 8, there is shown there details of the optical features of cylindrical imaging lens 218 of FIG. 2. Two end faces 808 (only one shown) are provided as flat surfaces so that cylindrical lenses 218 can be lined up end to end to effectively make up one continuous cylindrical lens, which in the case of the system of FIG. 1 is six altogether. One or both of the curved surfaces 802 and 804, respectively, could be aspheric to improve image sharpness and thereby maximize the intensity of the resulting line of light in the illumination plane 228. The improved imaging afforded by the aspheric lens is critical and is not typical of prior art, which uses a section of a circular cross section rod lens resulting in significant third order spherical aberration and compromised intensity. The sides 808 should be planar and have a good surface finish so that light entering the lens on surface 802 but incident on sides 808 is substantially reflected by total internal reflection and not lost due to scattering which would otherwise reduce the intensity near the space between lenses 218.

Figure 9:
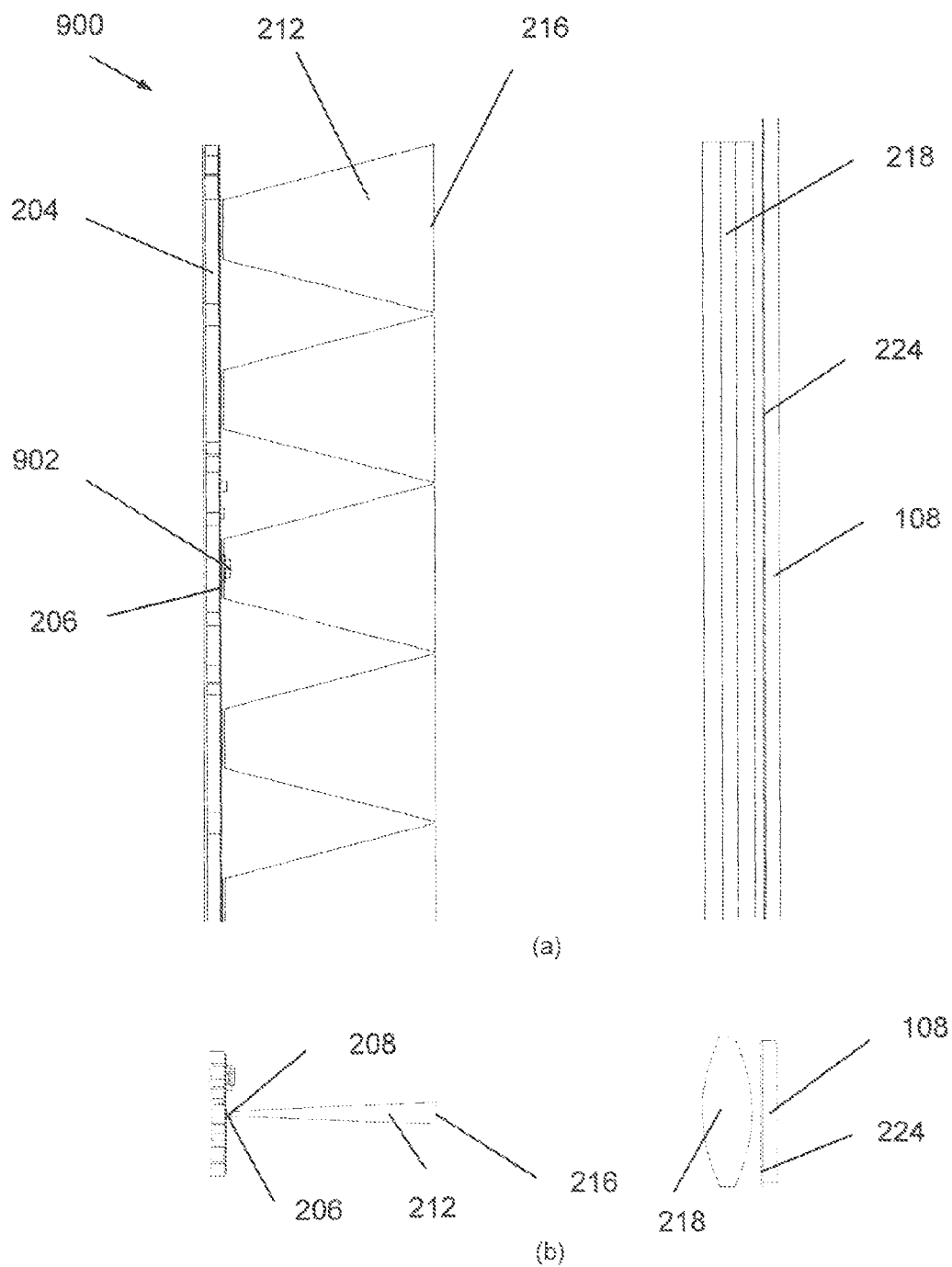
FIG. 9(a) and (b) show respectively, diagrammatic top and side on views of the optics of FIG. 6.

FIG. 9 shows two views, (a) and (b), emphasizing the optical features of a single LED light module 600 with a top view above (a) and a side view (b) on the bottom. Also shown is the position of a photosensitive detector 902 which can be used to monitor the output of the light module 600 so as to allow for closed loop control of the light as the system either changes temperature or ages.

Figure 10:
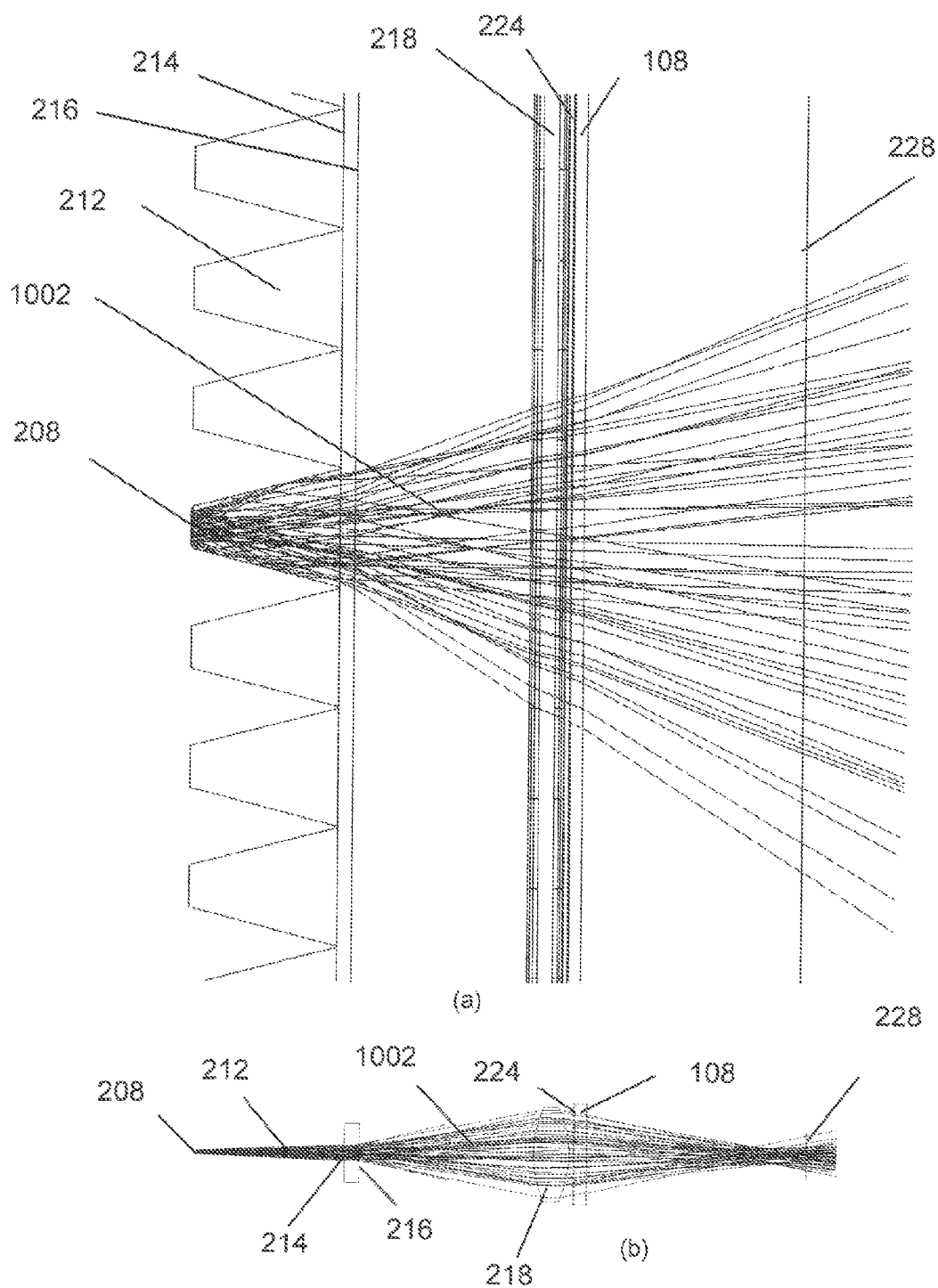
FIGS. 10(a) and 10(b) show diagrammatic top and side on views of one set of collection optics from the system of FIG. 6 indicating the path of optical rays from the LEDs to the plane of illumination.

Referring now to FIG. 10, there is shown two views, (a) and (b), of rays as traced from a single LED or LED die array at 208 for a single tapered collection optic 212. In the horizontal X-Z plane are shown ray traces in the upper image, FIG. 10(*a*), and ray traces for the vertical Y-Z plane are shown in the lower image, FIG. 10(*b*). The upper image shows how the divergence of the rays in the illumination plane is limited by the affect of the collection optic 212 (assuming no diffuser) in the horizontal plane and by the cylindrical lens 218 in the vertical plane.

Figure 11:
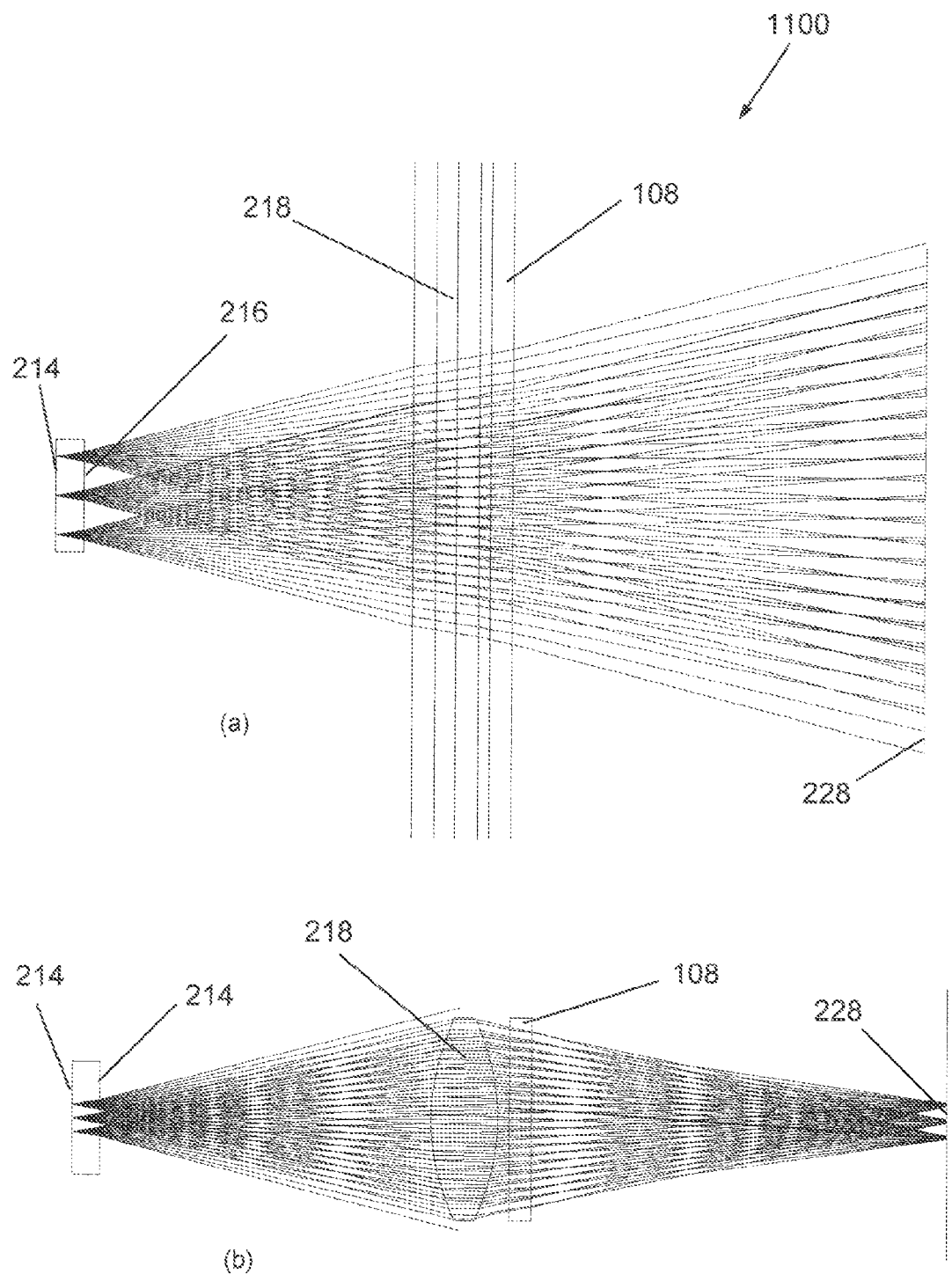
FIGS. 11(a) and 11(b) show diagrammatic sequential ray traces from the exit of the taper thorough the cylindrical lens, diffuser, and window to the illumination plane of the invention.

Similarly, FIGS. 11 (*a*) and (*b*) show a sequential ray trace from the optical software package ZEMAX of the same two orthogonal views. In the lower image of FIG. 11(*b*) it is clear how well the image produced by the bi-aspheric lens 218 is resolved with negligible aberrations. The resulting intensity plots from ray summations from FIG. 10 are shown in FIGS. 12A and 12B, and represent scans in the horizontal and vertical axes, respectively. The distribution of a single collection taper in FIG. 12A was optimized along with the center to center distance of the tapers to result in a line of light from all tapers which is substantially uniform, that is, better than +/−5% non-uniformity. Since the composite intensity distribution is the summation of all light from all tapers in this linear system, strict attention to the impulse response of a single taper in the horizontal plane of FIG. 12A, and to the center to center spacing of the taper, is critical to achieving acceptable uniformity. An additional consideration is that of the intensity fall off at the edge, which is primarily a function of the far field angle of the output of the taper in the horizontal plane, which for the taper 212 is approximately 30 degrees half angle.

Figure 13:
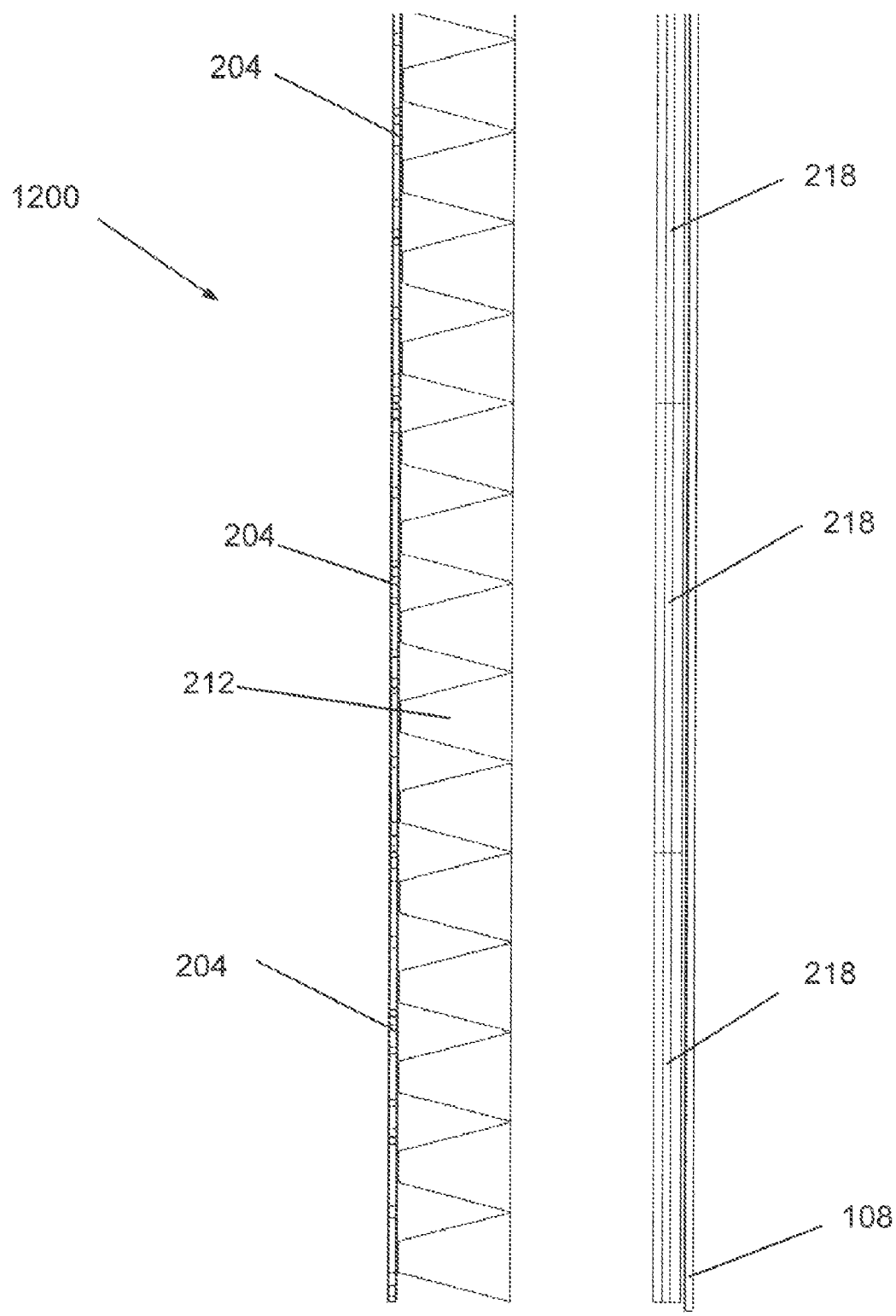
FIG. 13 diagrammatically shows three of the six modules edge to edge showing the ability of the system of optics to extend to any arbitrary length.
Figure 14:
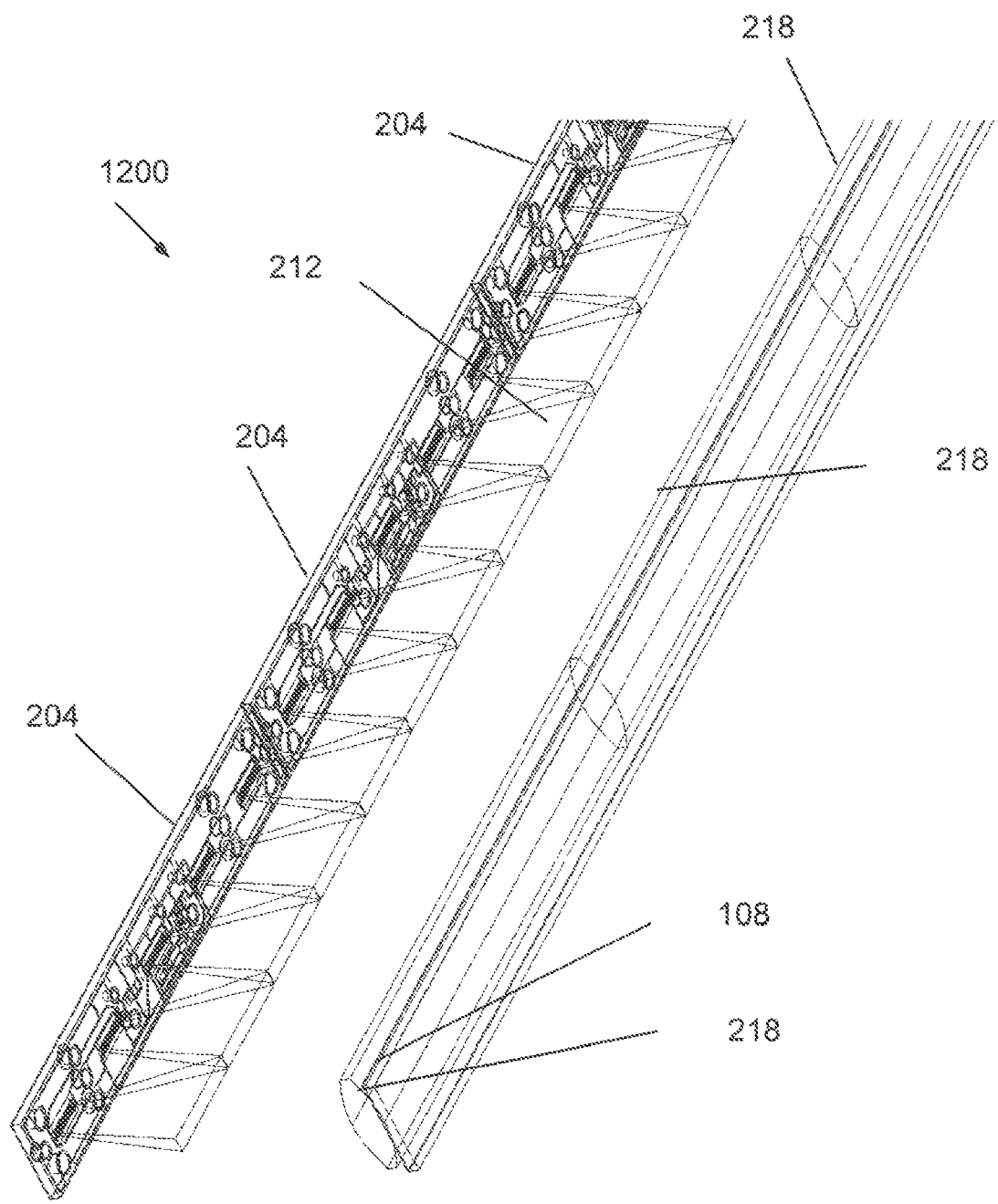
FIG. 14 shows a diagrammatic exploded isometric view of the system of FIG. 13.

Referring now to FIG. 13. there is shown a system 1200 comprising three LED board sections showing how the individual tapers 212 line up adjacent each other as do the individual cylindrical lenses 218 to form a continuous line of light of arbitrary length, depending on how many modules are stacked end to end. FIG. 14 shows an isometric view of the system 1200 of FIG. 13.

Figure 16:
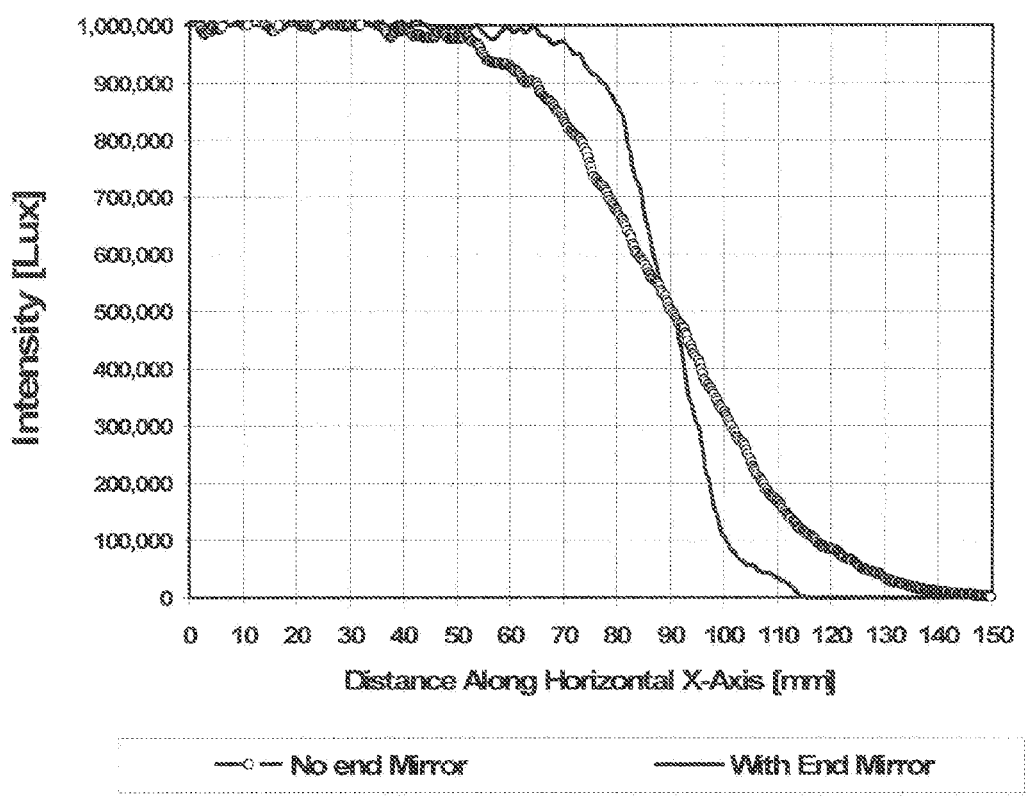
FIG. 16 is a graph showing the improvement in the slope of the intensity resulting from adding the mirror of the system of FIGS. 15 A, 15 B, and 15 C.

FIG. 15(*a*) shows a view in the X-Z plane of the optics of the system 100 of FIG. 2 for an end most set of optics. FIG. 15(*b*) shows the system 100 comprised of the same system as that in 15(*a*), but with the addition of a mirror 1502, which acts to redirect the light at the edge of the field back toward the center to result in a sharper transition at the edge of the field, and effectively, an overall broader line of light in the horizontal direction without intensity fall off. A side on view of the mirror 1502 of FIG. 15(*b*) is shown in FIG. 15(*c*) showing the mirror 1502 positioned between the output of the taper collection optic 212 and the window 108 and extending along the side of the cylindrical lens 218. The nominal position 228 of the illumination plane is shown in FIGS. 15(*a*), 15(*b*), and 15(*c*). The resulting improvement in the sharpness of the light transition is shown in the plot of FIG. 16. The 90% to 10% width without the mirror is shown to be on the order of fifty five millimeters, and that with the mirror to be decreased down to the order of half that value.

Figure 17:
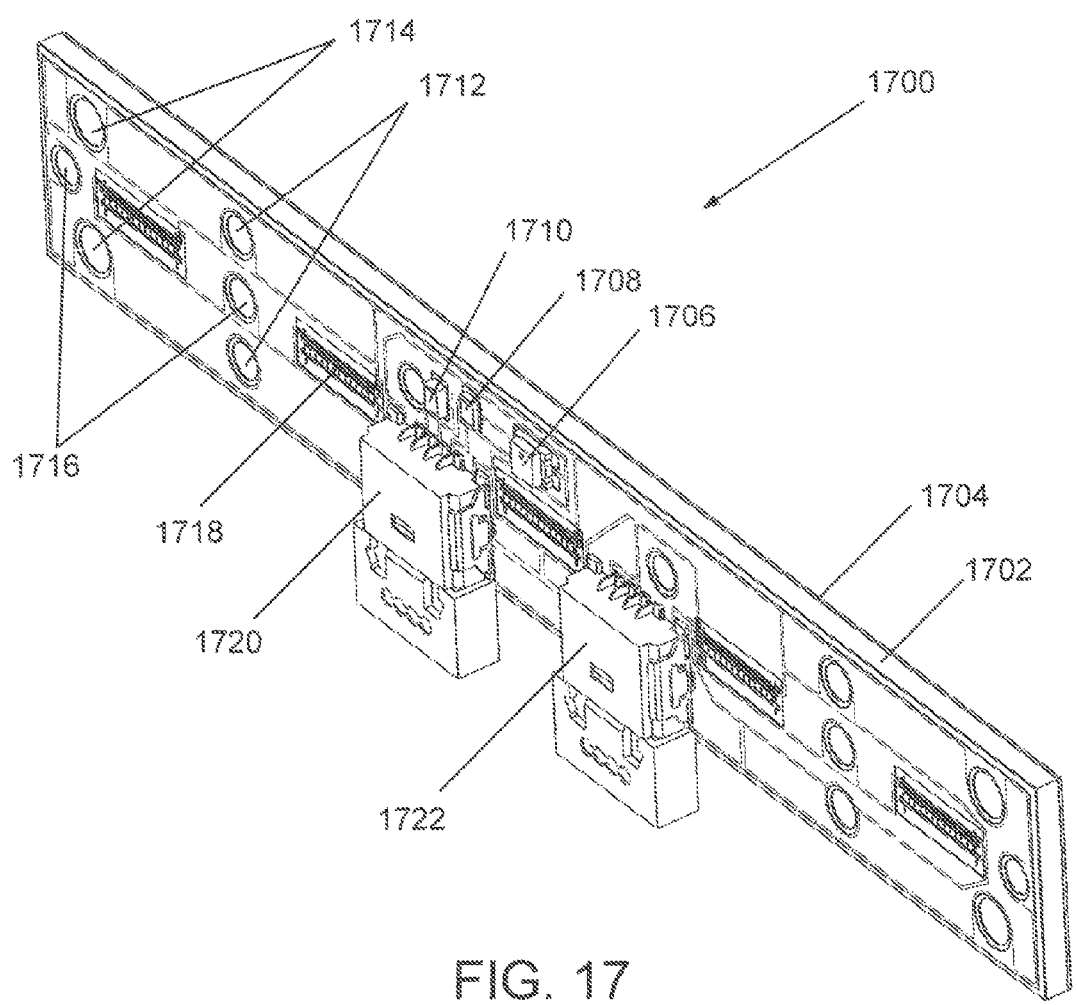
FIG. 17 shows a diagrammatic isometric view of the LED printed circuit board (PCB) of the system of FIG. 6.

The system 1700 of FIG. 17 represents a preferred embodiment of a metal core PCB which makes up part of the unit LED module 209 of the system of FIG. 3 and which interfaces to the collection optic array 210. A "Chip-on-Board" (COB) metal core substrate printed circuit board (PCB) 1702 with twelve (12) individual LED die per LED group for six hundred micron LED die, or alternatively, six, one thousand seventy micron LED die, 1718 are shown which are optically coupled to input apertures 208 of collection optic array 210 of FIG. 2. While the system 1700 is based on a single color, it should be apparent that traces could readily be provided to allow for multiple colors to be driven either simultaneously or independently. That is, there can be multiple colors within each of the five LED groups 1718, for example, independent control of blue, green, amber, and red is often desired. This board technology can easily be configured for independent control of all colors and the collection optic 210 was specifically optimized to accommodate multiple colors while providing a high degree of intensity uniformity at the illumination plane for each of the colors independently and between colors as well. The four kinematic alignment pins 706 (one each) and 708 (three each) of FIG. 7 are positioned into the two holes 1714 at each end of the board 1702. This COB metal core PCB is of the type such as those available from The Bergquist Company of Chanhassen, Minn. The lowest thermal impedance is obtained by mounting the LED die groups 1718 directly to the metal core, typically comprised of copper or aluminum substrates. That approach, however, requires that the LED die have common anodes (bottom contact) between the five groups. Other high performance board substrates include, but are not limited to composite materials such as aluminum or copper and silicone carbide, graphite or CVD diamond. One of the best overall performance and cost tradeoffs is aluminum, however. To be able to drive the LED die array group 1718 in series with the other four groups of die arrays, however, which is required for some applications and drive circuits, there must be a thermally conductive, but electrically insulating layer with a copper foil above it to which the LED die attaches. Within a group 1718 of the system 1700, the LED die are in parallel with each other, but between groups they are in series. Although it is possible to attach individual boards in series or parallel, connecting them substantially in series results in lower currents, which are generally preferred. The thickness of the copper foil typically ranges from one (1) oz. to the order of ten (10) oz. to act as a heat spreader thereby reducing the heat flux in passing through the electrically insulating layer. For many applications, such as this one, two (2) oz. foil is a good choice. The dielectric is typically on the order of seventy five (75) microns or less and typically has a thermal conductivity on the order of 2 W/m-K in comparison to the order of 160 W/m-K for aluminum and 370 W/m-K for copper. The fact that the dielectric is very thin and the heat flux is reduced by thermal spreading in the foil layer that the die are directly attached to in the case of series operation, minimizes its effective thermal impedance.

An additional benefit of using COB PCB technology is that electrical drive circuit devices or monitoring circuits such as a thermistor 1710 and a photosensor 1706 and a photosensor feedback resistor 1708 can be attached directly to the COB PCB by standard surface mount techniques well know in the art, thereby eliminating the need for the added cost, space, and complexity of additional external drive circuitry if desired. A wire harness or electrical connector can be mounted directly to the COB PCB to get power and or control signals to and from the board, such as connectors 1720 and 1722, as shown. A temperature sensing device such as thermistor 1710 is often added to the COB PCB to monitor temperature. If closed loop intensity operation is required, a light photosensor 1706 and control circuit can also be added to the COB PCB to account for changes in light output as a function of time and temperature. COB PCB's can have multiple layers attached by standard electrical vias with successive foil layers separated by the same dielectric described above.

The heat from the COB PCB 106 is conducted to the housing base 108 by use of a thermally conductive conformal pad 1704. These thermal pads are available from companies such as The Bergquist Company referenced above. They are available in a range of thicknesses, thermal impedances, electrical conductivity, and material compliance. Alternatively, a thermally conductive paste can replace the thermal pad, but pastes can be awkward in volume production and are not generally preferred. The fins on the housing would generally be oriented in the substantially vertical direction to work best in free convection if forced air was not available. If it was desired to operate at even higher intensities, a plenum of fans could be added to the outside of the housing. Other well known cooling techniques in the art such as water cooling, heat pipes, and thermoelectric cooling could be used as well. The very high performance and efficiency of the preferred embodiment, however, will work well in free convection for most applications.

With reference to FIG. 17, holes 1716 on both ends of the board serve two functions. The outside holes are used to place alignment pins between the PCB and housing and the four inside holes are used to attach the PCB to the housing by use of self taping machine screws from the outside, an arrangement which simplifies assembly and assures good alignment between the six LED modules of FIG. 3. The four holes 1716 equidistant from the ends of the board are tightly toleranced relative to the laser scribes on the board which are used to align the apertures to the LED die via interfacing with the kinematic pins as described above.

Figure 18:
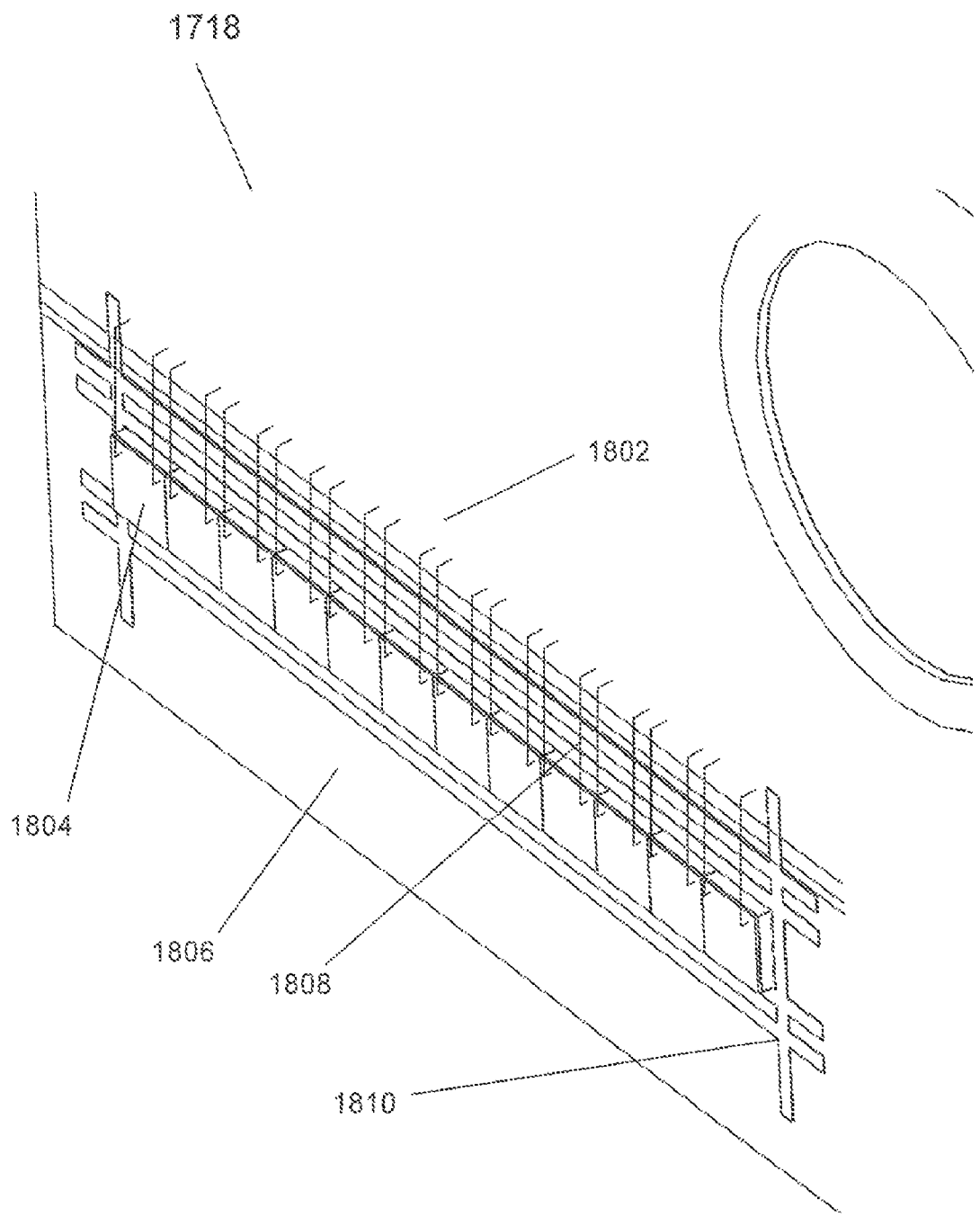
FIG. 18 shows an enlarged diagrammatic close up of one of the five groups of LED die of the system of FIG. 17.

Reference is now made to FIG. 18 which shows an enlarged diagrammatic perspective of the LED die array group 1718 of FIG. 17. Twelve, six hundred micron on a side, LED die 1804 are positioned edge to edge between the laser alignment scribes 1810 for accurate positioning relative to the input aperture 208 of collection optic 212. The LED die are generally attached by conductive epoxy, solder, or eutectic attachment methods well known in the art. The inner set of laser scribes 1810 corresponds to the six hundred micron LED die which slightly under fill input aperture 208 of the taper, and the outer set of laser scribes 1810 correspond to the use of one thousand seventy micron standard die, which slightly overfills the width of input aperture 208 of the tapered collection optic 212. Wire bonds 1808 are shown extending from the top of the LED die 1804 to a wire bond pad surface 1802 which, in turn, is connected to the bottom side (anode) of the next group of LED die so that between groups they are connected in series. Choosing LED die with similar properties of wavelength, intensity, and forward voltage assures optimal uniformity and reliability, as the current draw through the LED die would be similar.

One very important aspect of the invention is that there is no index matching gel between the LED die and the input aperture 208 of the collection optic 212 for the purpose of maximizing the effective line source intensity by recognizing the role of the index squared portion of the Etendue (index squared, area, solid angle product). Historically, the extraction efficiency of LED die increased by approximately the square of the index of refraction of the index matching gel (about 2 times). However, due to surface extraction enhancement technology used in state of the art LED die, this is no longer true. In fact, the shorter wavelength GaN LED die (UV through green) only increase by the order of 20% to 40% depending on the LED die manufacturer, and the longer wavelength amber to red and near infrared LED die only increase by the order of 50% to 60% when index matched. Thus, due to the index squared factor of the Etendue, brightness is enhanced by not using index matching gel, which for a fixed Etendue effectively increases the allowed area of the source allowing the LED die to run at lower current densities. Additionally, in the case of broad band white LED light, which is typically derived by coating blue LED die with a phosphor and silicone mixture, the LED is already index matched and there is minimal increased output from using index matching gel. The phosphor is of a type such as cerium doped YAG (Ce:YAG) that is well-known in the art or one of the alternative yellow phosphors available from companies such as Internatix of Fremont, Calif. A portion of the blue light emitted by the LED die is absorbed by the phosphor and re-emitted as yellow light which, in combination with the scattered, but non-absorbed blue light, produces the appearance of white light. Typically, the phosphor is held in place on the emitting surface of the LED die with a silicone material. In a preferred embodiment, the phosphor is applied by a conformal coating process such as that described in patent pending International Patent Application No. PCT/US05/45212 to achieve optimal color uniformity and intensity. Many prepackaged LEDs are encapsulated, which means they will result in effectively lower brightness relative to non-index matched LEDs on COB. Additionally, there is loss of light for tapers near the input apertures as light is transmitted through the side walls for light near, but on the inside of the entrance apertures of tapers instead of being totally internally reflected (TIR) as is the case when no index matching gel is used.

Figure 19:
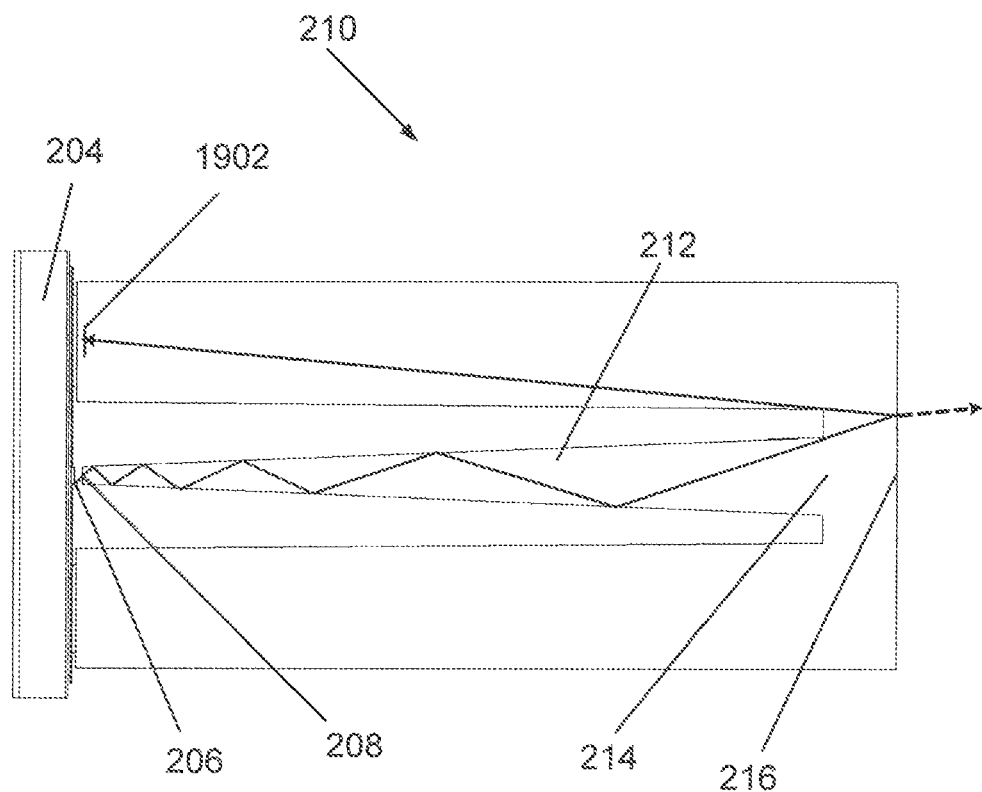
FIG. 19 diagrammatically shows the ray path of light leaving the LED die, passing up the taper and reflecting down the side of the collection optic of FIG. 7 for the LED module of FIG. 6.

Referring now to FIG. 19, there is shown a ray traveling down the taper of collection optic 210 and leaving the output aperture of the taper 214 such that the Fresnel reflection (approximately 4% to 5% depending on index of refraction) off surface 216 is directed back down the walls of optic 210 and is then incident on light sensor surface 1902. The advantage of this approach, rather than sensing light directly from the LED die 206, is that any changes in transparency of the taper with time can be monitored and corrected for. The light that reaches the sensor 1902 will have contributions from more than one taper and should be representative of the other LED die and tapers. It is possible, however, to use one light sensor for each of the five LED groups, but probably of little benefit in most cases.

Figure 20:
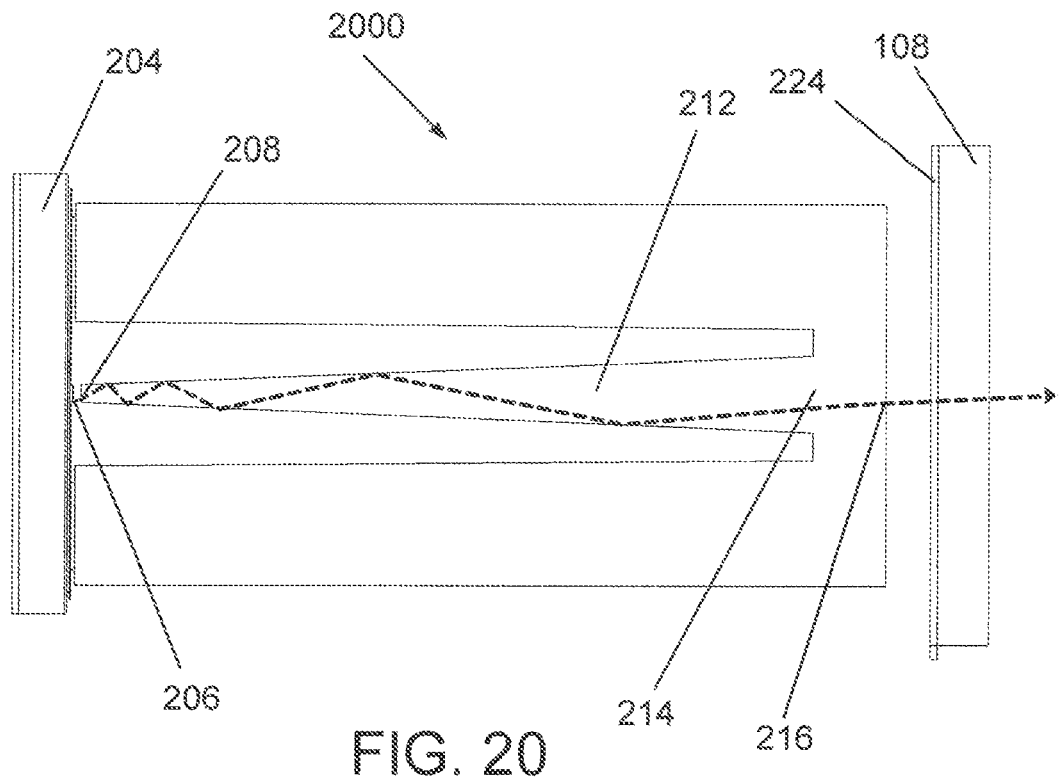
FIG. 20 diagrammatically shows an alternative embodiment of the system of FIG. 2 with no cylindrical lens and the diffuser and window moved close to the output of the optic of FIG. 7.

The system 2000 of FIG. 20 represents an alternative embodiment to the optical system of FIG. 2 for which the cylindrical lens has been removed, and the diffuser 224 and window 108 have been moved to just outside the exiting surface 216 of optic 210. This system would be useful in the case where there is not sufficient room for the lens. Near field uniformity would be enhanced by the use of a one dimensional diffuser which spreads light in the horizontal plane only. In the system of FIG. 2, the diffuser often would not be used, and if used, it would only be a mild diffuser to clean up the beam in the horizontal unless there was an application that needed a broader distribution in the vertical as well, in which case a uniform or elliptical diffuser could be used. A number of companies market high performance elliptical, or one-dimensional diffusers, such as those termed "holographic diffusers" by such companies as Luminit of Torrance, Calif., or "Engineered Diffusers" by companies such as RPC in Rochester, N.Y. Such one dimensional diffusers may control surfaces comprising selectively textured versus non-textured areas, holographic elements, and macroscopic refracting elements.

Figure 21A:
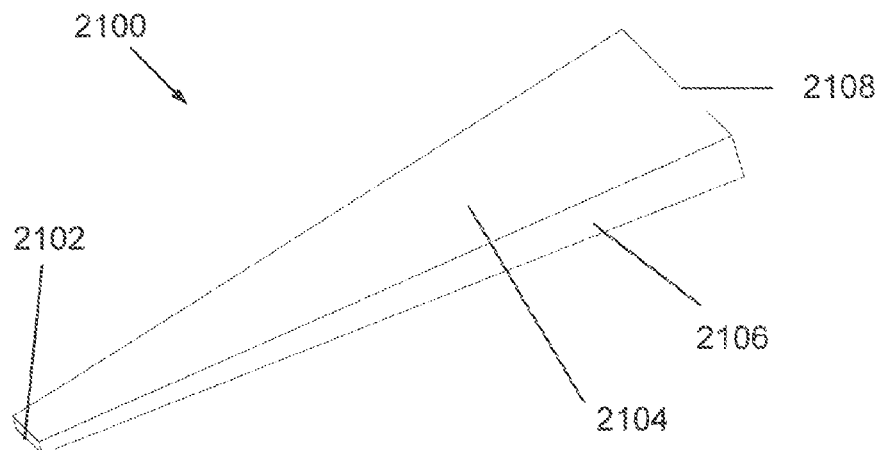
FIGS. 21(a) and 21(b) diagrammatically show, respectively, a collection optic taper without and with an integrating light pipe to allow for improved mixing when multiple LED die colors are used.
Figure 21B:
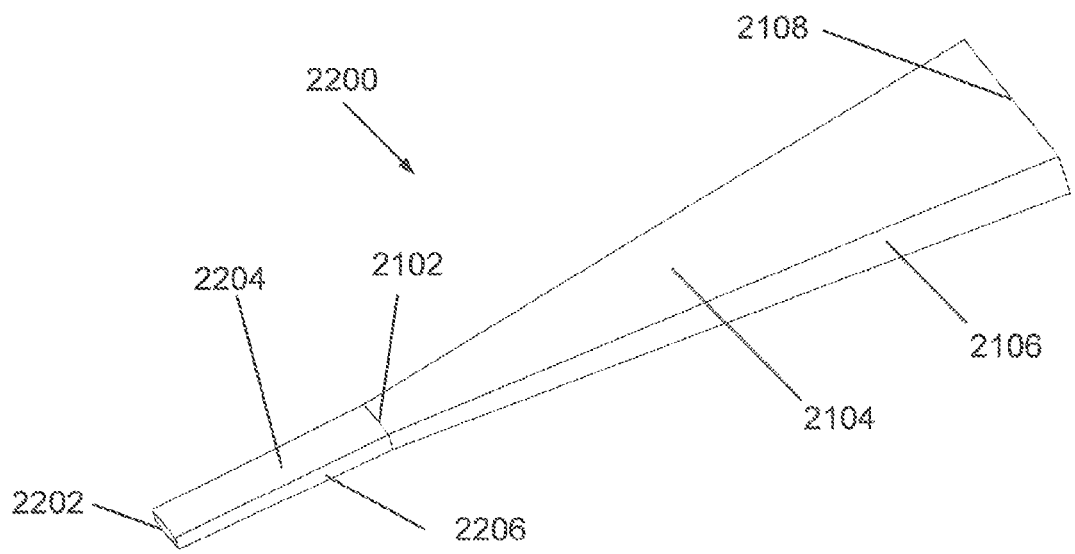

Referring now to FIG. 21(a), there is shown a taper optic 2100 with entrance aperture 2102, exit aperture 2108, and large and small wall sides 2104 and 2106, respectively. FIG. 21(b) shows a modified taper optic 2200 with a straight walled homogenizing light pipe with entrance aperture 2202 and side walls 2204 and 2206 attached at 2102 of the taper of FIG. 21(a). The purpose of the light pipe is to provide additional homogenization of the light entering from LED die which would be positioned at 2202. This additional mixing may not be required in general, but may be of value for systems requiring extremely uniform intensities which are comprised of multiple LED die colors into each entrance aperture. It is worth noting that the preferred embodiment of the taper as represented in FIG. 7 was optimized for use with multiple die colors to result in minimal intensity fluctuations between colors. This high level of mixing or homogenization is one of the benefits of using straight tapers. In fact, the taper of FIG. 7 was optimized to work well with three independent colored LED die at the input of each collection optic aperture. The additional homogenizing section of 2200 can readily be added to a collection optic array such as the preferred embodiment represented by optic 210 detailed in FIG. 7, again if even higher levels of intensity uniformity are required. The relatively long length of the taper in FIGS. 21(a) and 21(b) would result in a relatively sharp far field distribution. In general, the longer the taper for a given ratio of input and output aperture dimensions, the flatter the far field intensity distribution will be, but often there is a trade off between length and far field. For example, the length of the taper of FIG. 7 is twenty five millimeters. Increasing the length would not benefit throughput through the limited height cylindrical lens substantially, so this length was found to be a good compromise. Decreasing the length too much below twenty five millimeters, however, would result in a poorly defined far field, which would result in vignetting at the top and bottom aperture of the cylindrical lens 218 and compromised intensity at the illumination plane 228.

Figure 22:
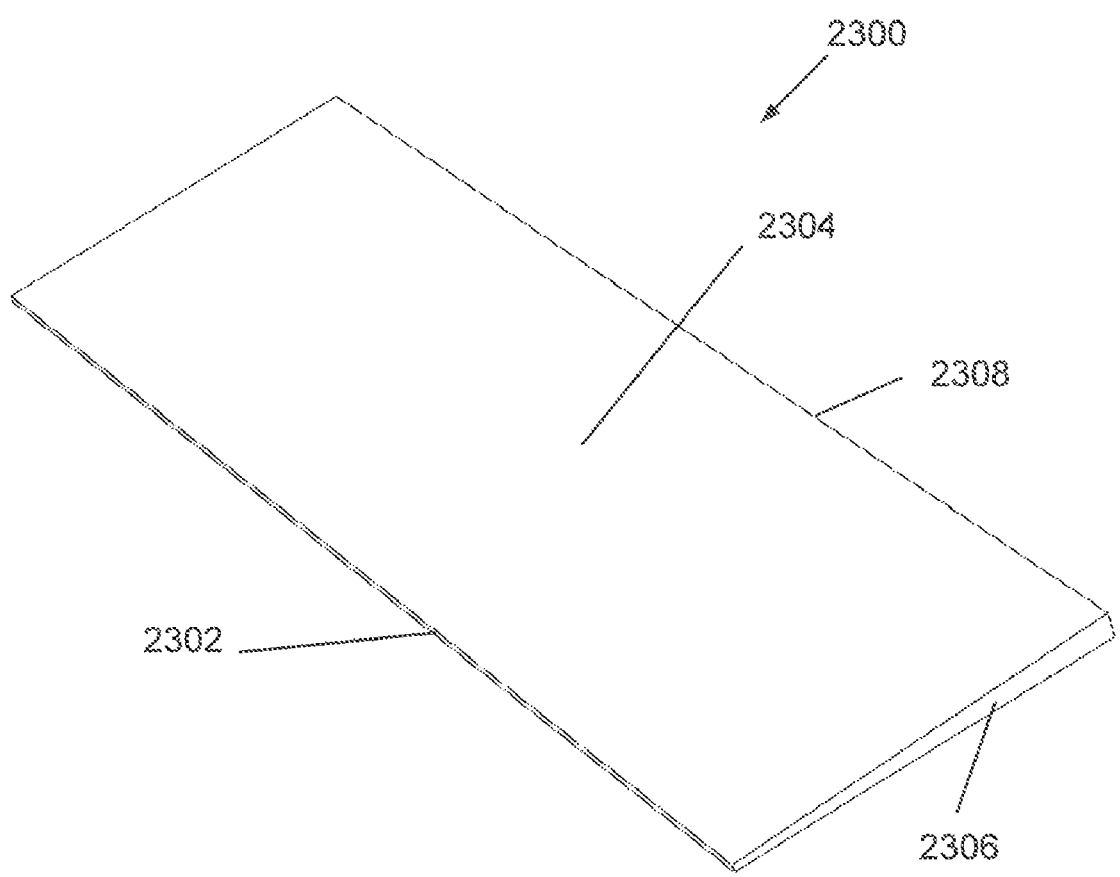
FIG. 22 shows a diagrammatic perspective view of a one dimensional taper.

A diagrammatic perspective of a one-dimensional taper 2300 is shown in FIG. 22 for which there is a taper between long sides 2304 on the top and bottom with the two sides 2306 being parallel. In this way, a continuous line of LED die could be positioned at input aperture 2302. The light exiting aperture 2308 would be Lambertian (falls off as cosine-θ). In the horizontal plane, that is unchanged, but decreased in divergence in the vertical plane. The most significant disadvantage of this system is that the light that would be reimaged to a line by a cylindrical lens in the horizontal plane would suffer from significant fall off near the edges resulting in a much smaller constant intensity region confined to the central portion of the collection optic.

Figure 23:
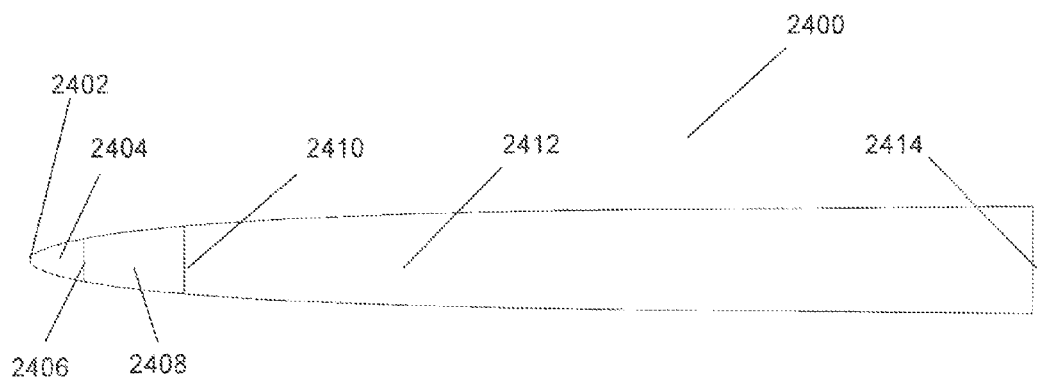
FIGS. 23 A, 23 B, and 23 C diagrammatically show, respectively, a side on, top, and isometric view of a hybrid compound parabolic concentrator (CPC) and taper resulting in a higher concentration factor than that of the taper alone.
Figure 23:
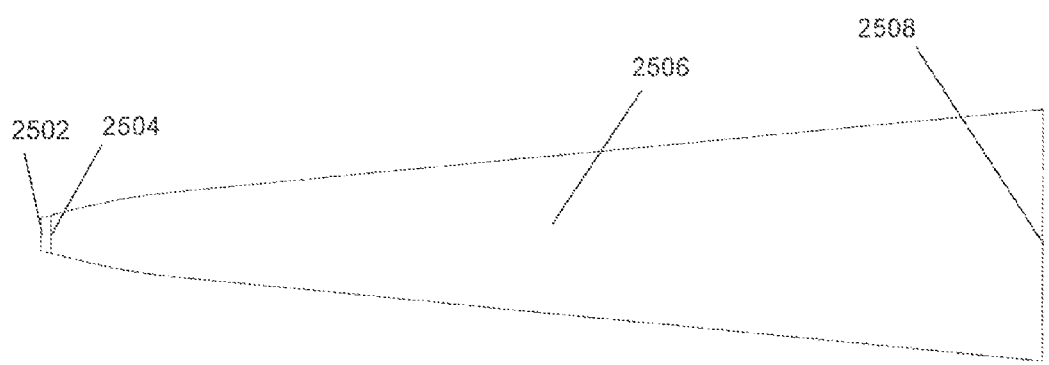
Figure 23:
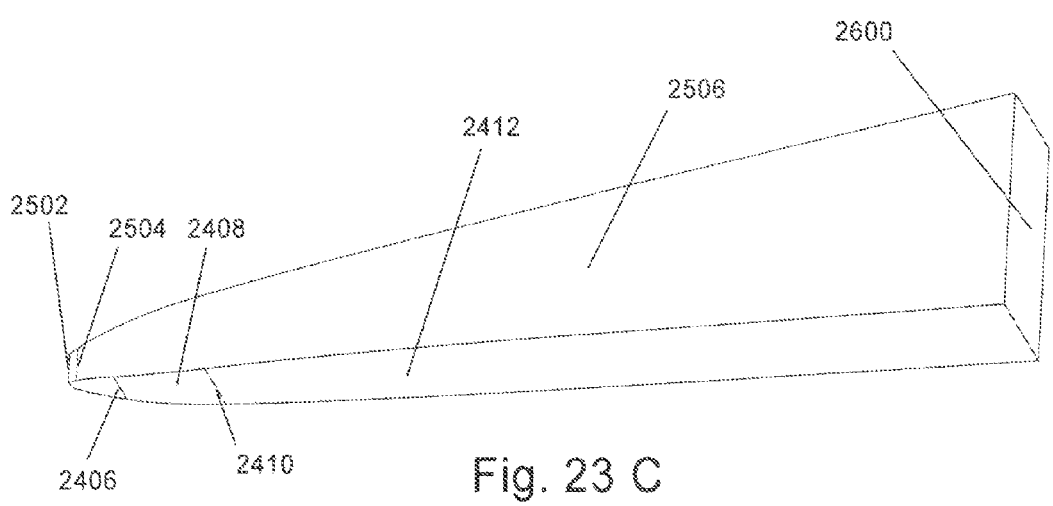

FIGS. 23A, 23B, and 23C represent a side view, top view, and isometric view of a hybrid compound parabolic concentrator (CPC) 2400 and taper optic of rectangular form that could be used in place of a standard taper. Opposite sides of the optical concentrator 2400 are symmetric. The sections 2408 and 2506 are compound parabolic concentrator (CPC) sections of the type described by Winston and Welford in a book entitled "High Collection Nonimaging Optics" published by Academic Press and are made of tilted and shifted parabolic sections according to the edge ray principle. The CPCs are truncated near the entrance apertures 2402 and 2502 according to the theta by theta concentrators described for the case of rotational symmetry by Welford. To make sure that the exit surfaces end at the same distance from the entrance aperture, the CPC that ends at 2410 is extended by a straight wall up to the output face 2508. The advantage of the CPC over a straight taper is that CPCs are characterized by improved concentration ratios for a given output numerical aperture (sine of exiting half angle also designated as NA) which would result in a higher intensity. The disadvantage, however, is that the output intensity distribution and far field is more sensitive to the position of the sources at the entrance aperture. Thus, if the entrance aperture is fully filled with a single color LED die, the CPC would result in the highest efficiency. If however, the CPC was not fully filled, the intensity would have compromised uniformity. One could, however, add a straight homogenizing section as described in connection with FIG. 21 to the input aperture of the collection optic of FIG. 23 to reduce the sensitivity and thereby get the best of both, high intensity and reduced sensitivity to input aperture uniformity. In some cases, tooling costs will play a role, as in general it is easier to make tooling for straight walled tapers rather than curved CPCs. Another option is to use the CPC in only the vertical plane with no CPC section in the horizontal plane, which would not require a homogenizing light pipe at the input aperture and would decrease tooling costs over using CPCs on all sides.

Figure 24:
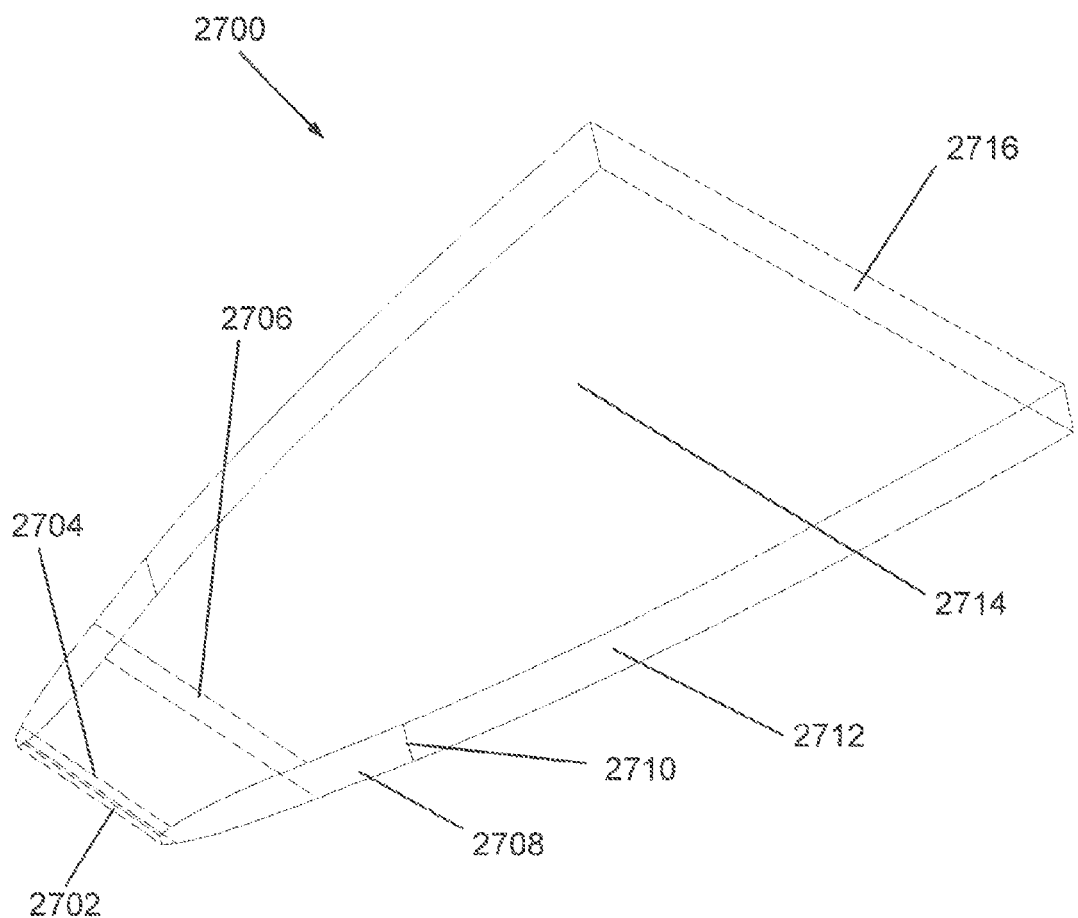
FIG. 24 shows a diagrammatic perspective view of a second hybrid CPC and taper collection optic.

Referring now to FIG. 24, there is shown in diagrammatic perspective a two axis CPC concentrator 2700 with a larger aspect ratio, but with similar features as to the optic of FIG. 23C. The CPC surfaces are represented by the surface between 2704 and 2706 in the horizontal and by 2712 in the vertical with the straight taper section existing between the input aperture 2702 and 2704 on the top and 2708 on the side.

Figure 25A:
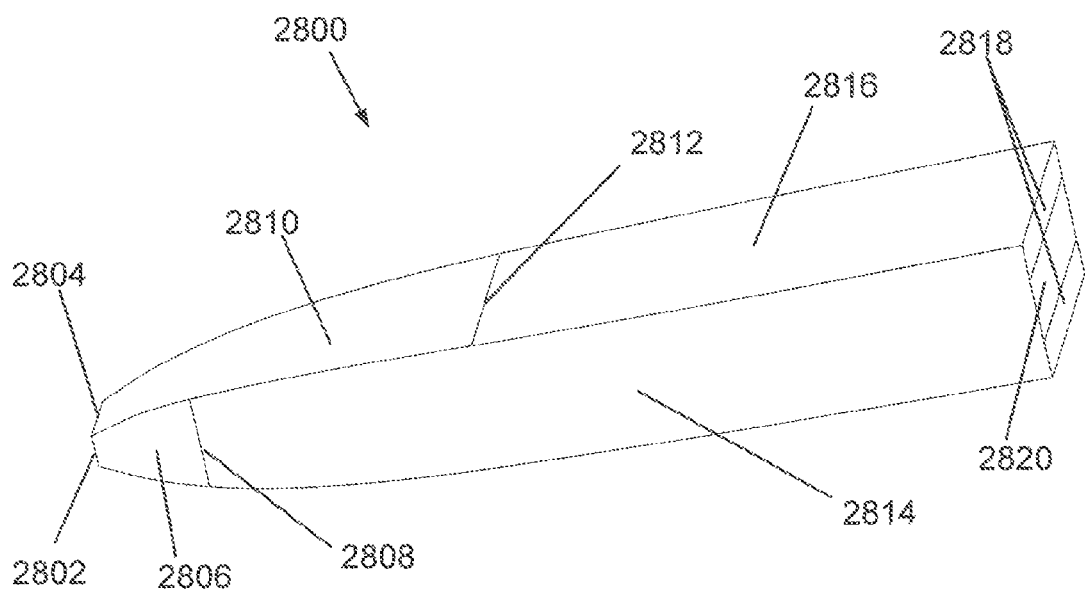
FIGS. 25(a) and 25(b) show diagrammatically a hybrid CPC and taper collection optic with a larger input and output aperture for use with larger LED die also comprising reflective apertures on the output face to increase the intensity of the output aperture lying between the reflective apertures.
Figure 25B:
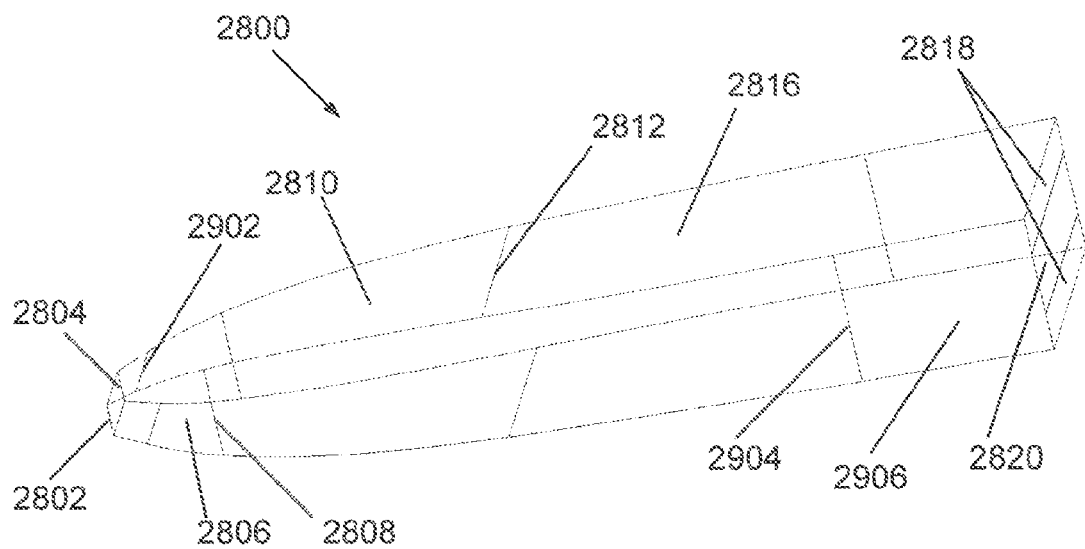

FIGS. 25 (a) and (b) represent another embodiment of a rectangular theta by theta CPC 2800 with two mirrored surfaces 2818 added to the top and bottom of output aperture 2820. Light entering the input aperture at 2804 and 2802 travels down the optic 2800 and only that light which lays between reflective apertures 2818 exits the optic with the light incident on the mirrored surface reflecting back to the entrance aperture where it has an opportunity to reflect back up the optic off of the LED die or phosphor thereby effectively increasing the brightness exiting the non-mirrored surface at 2820, which would ultimately result in higher intensity at the illumination plane if this system were to be used in a configuration such as depicted in FIG. 2. The enhancement for use with white light from blue LED die and phosphor is on the order of 25% to 50%, depending on the relative dimensions of the mirrored surfaces relative to the transmissive portion of the output aperture and the distance between the LED/phosphor and the entrance aperture. This general approach is much less effective with tapers, as the multiple bounces result in some of the light being lost out through the side walls near the input aperture by exceeding the TIR angle. Thus; the benefit for tapers would only be on the order of 10% or less and, in general, would not be worth the effort, but for the case of CPC based collection optics, there is sufficient benefit to warrant manufacture of such a configuration.

Figure 26:
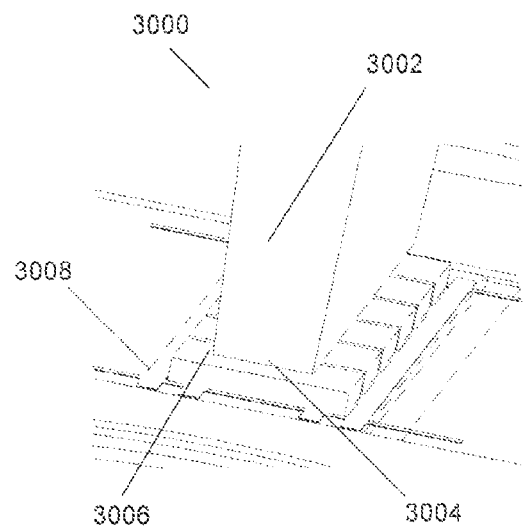
FIGS. 26A, 26B, 26C, and 26D show diagrammatically a reflective optic used in conjunction with larger LED die to increase the light coupled into the input aperture over that which would be achieved with smaller LED die.
Figure 26:
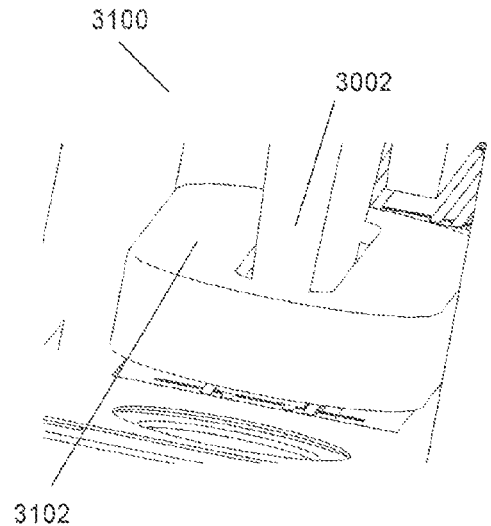
Figure 26:
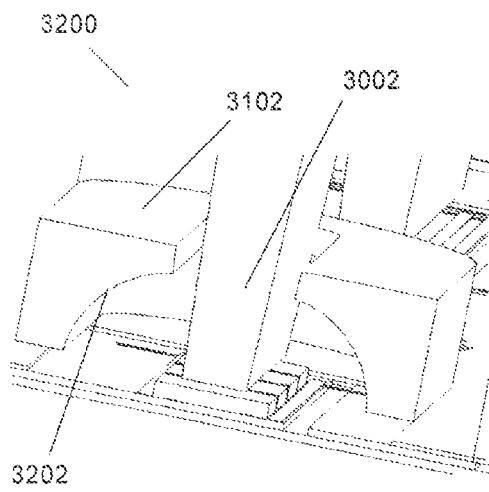
Figure 26:
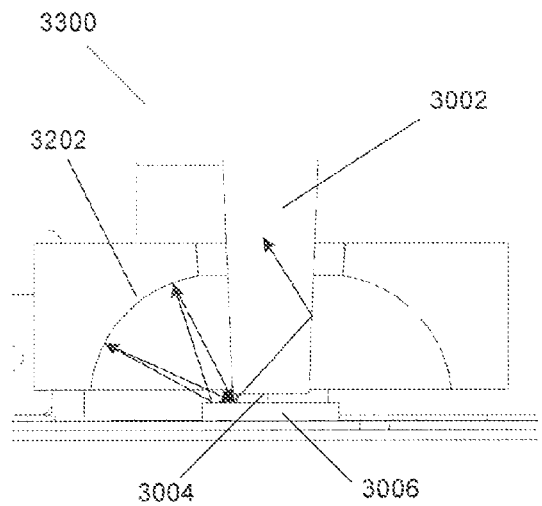

FIGS. 26A, 26B, 26C, and 26D represent systems 3000, 3100, 3200, and 3300, respectively, that show how light that would otherwise be lost outside the entrance aperture of the taper of the system of FIG. 2 could be recovered by a reflective surface 3202 of a reflector 3102 thus having an opportunity to be launched up the taper 3002. FIG. 26A shows an isometric view with the LED die overfilling the input aperture of the taper. FIG. 26B shows the position of the reflector 3102 relative to the taper 3002. FIG. 26C shows an isometric sectioned view, and FIG. 26D shows a straight on view of the sectioned reflector with arrows indicating ray paths for the reclaimed light.

Having shown and described the apparatus of the invention together with its methods of manufacture and operation, variants will be evident to those skilled in the relevant arts and such are considered to be within the scope of the appended claims.

What is claimed is:

1. A lighting apparatus for producing a high intensity line of light, said lighting apparatus comprising:
   an elongated support member having formed thereon a linear array of regularly spaced LED modules each of which comprises one or more LED emitting areas having a predetermined spectral output that is emitted over a predetermined solid angle;
   an array of spaced apart non-imaging concentrators the individual non-imaging concentrators of which are optically coupled in one-to-one correspondence with said regularly spaced LED modules, each non-imaging concentrator in said array of non-imaging concentrators having entrance and exit apertures and operating to collect radiation emitted by each of said LED modules and to re-emit substantially all of said collected radiation as a diverging beam having a solid angle smaller than said predetermined solid angle over which radiation is emitted by each of said LED modules where said diverging beam is spatially and spectrally uniform in the near field of said exit aperture and propagates in a direction along an optical axis of said apparatus with controlled angular divergence in mutually orthogonal planes; and
   an elongated cylindrical lens positioned to receive radiation emerging from said exit apertures and converge it to a bright line of light forward of said apparatus.

2. The lighting apparatus of claim 1 wherein said elongated cylindrical lens is bi-aspheric in cross section.

3. The lighting apparatus of claim 1 further including an elongated diffuser positioned downstream of said elongated cylindrical lens to receive radiation emerging from it to further control the far field angular spread of light by preselected amounts in said mutually orthogonal horizontal and vertical planes.

4. The lighting apparatus of claim 1 wherein said LED emitting areas are selected from the group comprising R, A, G, B LEDs, Blue LEDs used in conjunction with red and green phosphor, and Blue and Green LEDs used in conjunction with red phosphor.

5. The lighting apparatus of claim 1 wherein said non-imaging concentrators are selected from the group comprising compound parabolic, elliptical, hyperbolic concentrators, straight tapers, and concentrators having curvatures described by higher order polynomial functions.

6. The lighting apparatus of claim 5 wherein said non-imaging concentrators further include a homogenizing section located forward of said entrance aperture to promote uniform color and intensity distribution in said bright line.

7. The lighting apparatus of claim 5 wherein said non-imaging concentrators are rectangular in cross section to control the divergence of said diverging beam in vertical and horizontal planes mutually perpendicular to said optical axis.

8. The lighting apparatus of claim 1 said elongated support member is a printed circuit board.

9. The lighting apparatus of claim 5 further including drive electronics for said linear array of LED modules wherein said drive electronics and said linear array of LED modules are mounted to said printed circuit board as chips-on-board to reduce thermal management requirements and enhance optical efficiency.

10. The lighting apparatus of claim 1 wherein said elongated diffuser comprises an elliptical diffuser.

11. The lighting apparatus of claim 3 wherein the surfaces of said diffuser are selected from the group consisting of selectively textured versus non-textured areas, holographic elements, and macroscopic refracting elements.

12. The lighting apparatus of claim 11 wherein said diffuser is injection molded of optical plastic.

13. The lighting apparatus of claim 1 wherein said LED modules each comprises two or more LED emitting areas having a predetermined spectral output that is emitted over a predetermined solid angle.

14. The lighting apparatus of claim 1 further including a heat sink attached to said elongated support member to control the temperature of said illumination apparatus by selectively dissipating heat generated in the process of converting electrical energy to optical power to enhance the quantum efficiency of said apparatus.

15. The lighting apparatus of claim 1 further including at least one light sensor positioned on said elongated support member and at least one reflecting element positioned downstream of said elongated cylindrical lens to pick off a portion of light emerging from said cylindrical lens and direct it to said at least one light sensor to provide a feedback control signal for monitoring and adjusting the intensity of illumination provided by said LED modules.

16. The lighting apparatus of claim 1 further including a reflective optic used in conjunction with said LED modules to increase the light coupled into said input aperture over that which would be achieved without the use of said reflective optic.

17. The lighting apparatus of claim 1 wherein said elongated cylindrical lens is positioned with respect to said non-imaging concentrator so that the light emerging from said cylindrical in the vertical plane is focused ahead of said apparatus within a range from a few meters to infinity.

18. The lighting apparatus of claim 1 further including a pair of vertically oriented spaced apart mirrors parallel to the optical axis and positioned between said non-imaging concentrators and said elongated cylindrical lens to collect radiation spreading in the horizontal plane and converge it towards said elongated cylindrical lens to enhance the brightness of the line of light.

* * * * *